US007158937B2

(12) United States Patent  
Easter et al.

(10) Patent No.: US 7,158,937 B2  
(45) Date of Patent: Jan. 2, 2007

(54) ENCOUNTER TRACKER AND SERVICE GAP ANALYSIS SYSTEM AND METHOD OF USE

(75) Inventors: Clark Easter, Monkton, MD (US); Theodosia Ewers, Mount Savage, MD (US); Amy H. Koren, Pikesville, MD (US); Amitabh Mathur, Banglore (IN); James M. Easter, Owings Mills, MD (US)

(73) Assignee: Spectrum K12 School Solutions, Inc., Towson, MD (US)

( * ) Notice: Subject to any disclaimer, the term of this patent is extended or adjusted under 35 U.S.C. 154(b) by 0 days.

(21) Appl. No.: 10/698,423

(22) Filed: Nov. 3, 2003

(65) Prior Publication Data

US 2004/0143448 A1 Jul. 22, 2004

Related U.S. Application Data

(60) Provisional application No. 60/422,869, filed on Nov. 1, 2002.

(51) Int. Cl.  
*G06Q 99/00* (2006.01)

(52) U.S. Cl. .......................................... 705/1; 434/367

(58) Field of Classification Search ................ 705/1  
See application file for complete search history.

(56) References Cited

U.S. PATENT DOCUMENTS 6,270,351 B1 * 8/2001 Roper ........................ 434/118

FOREIGN PATENT DOCUMENTS

EP 1237096 A2 * 9/2002

OTHER PUBLICATIONS www.4glsoftware.com; any linkage; *Mar. 3, 2001; retrieved from the wayback machine Aug. 30, 2004.*  
PR Newswire; New York; Microsoft Names Winners of Technology Achievements in Education Awards. Feb. 29, 2000.*  
www.4glsoftware.com; retrieved from the wayback machine; any linkage Mar. 3, 2001.*

* cited by examiner

*Primary Examiner*—John G. Weiss  
*Assistant Examiner*—Traci L. Smith  
(74) *Attorney, Agent, or Firm*—Arent Fox PLLC

(57) ABSTRACT

Methods and systems for tracking whether an individual has received required services and for analyzing service gaps. In one embodiment, the present invention tracks special education students to ensure that they receive services that have been designated as appropriate for them. When a service is provided to any student by any provider, this information is input and maintained electronically. Once this information is entered, it can be analyzed to ensure that the services provided correspond with the student's IEP. In another embodiment, data from the input information on service encounters is usable with Medicaid or other reimbursement services to produce documents for submission for reimbursement.

33 Claims, 24 Drawing Sheets

Student List

[Look Up Students] [Add a New Student] [All Children I Manage] [Refresh]

Search Criteria Used for This List: ?

| Last Name | First Name | ID | DOB | Grd | SSN | Folder | Managing | Status | Client |
|---|---|---|---|---|---|---|---|---|---|
| | | | | | | | | | |

| Meeting | Assessment | IEP | Folder Transfer | Encounters: | Student |
|---|---|---|---|---|---|
| Meeting Data Issue | Assessment Data Issue | IEP Data Issue | Batch Transfer | Note History | |

FIG. 3

| Encounter Tracker - Student List | | | | | | | | | | | | | | |
|---|---|---|---|---|---|---|---|---|---|---|---|---|---|---|
| Completed Asmnt | Student | All IEP | | | Default Date | 08/14/2002 | | Not in SETS | Search | | | | | |
| Latest IEP | Old IEP | Open Asmnt | | | | | | | | | | | | |
| New | Last Name | First Name | ID | DOB | Grade | Attn | Manag | Dev Date | Due Date | Srv Code | | | | |

| Lat. Start | Act. Start | Act. End | Provider | Svc School | Ses | Direct - D | Direct | per | Clone Reas |
|---|---|---|---|---|---|---|---|---|---|
| ▲ | | | | | | | | | |
| ▼ | | | | | | | | | |

Encounter Detail - CHECK BCPSS

| Type | Service Given To | Date | WeekDa | Procedure Code | Provider | Presenting |
|---|---|---|---|---|---|---|
| ▲ | | | | | | |
| ▼ | | | | | | |

FIG. 4

Student Search Criteria Set Up

School Info

School Type

| Description | Status |
|---|---|
| Attending School | Active |
| Folder School | Active |
| IEP Servicing School | Active |
| Managing School | Active |

Value

Personal Info

ID  
First Name     Multiple IDs  
Last Name     Grade Code  
SSN

Provider

Provider  
Service Code  
Assessment Code

[Cancel] [Search]

FIG. 5

Encounter Tracker - Student List

| Completed Asmnt | Student | All IEP | | Default Date | 08/14/2002 | | Not in SETS | | Search |
|---|---|---|---|---|---|---|---|---|---|
| Latest IEP | Old IEP | Open Asmnt | | | | | | | |

| New | Last Name | First Name | ID | DOB | Grade | Attn | Manag | Dev Date | Due Date | Srv Code |
|---|---|---|---|---|---|---|---|---|---|---|
| | CRAWFORD | TEST 1 | | 05/15/1995 | 01 | 201 | 201 | 06/10/2002 | 06/11/2002 | 12 |
| ▽ | CRAWFORD | TEST 1 | | 05/15/1995 | 01 | 201 | 201 | 06/10/2002 | 06/11/2002 | 9 |
| ✿ | CRAWFORD | TEST 1 | | 05/15/1995 | 01 | 201 | 201 | 06/10/2002 | 06/11/2002 | 1 |
| ✿ | CRAWFORD | TEST 1 | | 05/15/1995 | 01 | 201 | 201 | 06/10/2002 | 06/11/2002 | 13 |
| ✿ | DAVIES | VIVIAN | | | 44 | 201 | 201 | 07/23/1999 | 07/24/1999 | |

| Lat. Start | Act. Start | Act. End | Provider | Svc School | Ses | Direct - D | Direct | per | Clone Reas |
|---|---|---|---|---|---|---|---|---|---|
| ▷ | 06/11/2002 | 06/12/2002 | | CLIENTID, TEST | 201 | 2 | 45.00 | Minu | We | Original Impleme |
| ＊ | | | | | | | | | | |

Encounter Detail - CHECK BCPSS

| Type | Service Given To | Date | WeekDay | Procedure Code | Provider | Presenting |
|---|---|---|---|---|---|---|
| ▷ | Consultation With Specia ▽ | External: Parent/ | 08/13/2002 | Tue | Family Counseling | CLIENTID, TES | Blindness |
| ＊ | | | | | | | |

| Encounter Tracker - Student List | | | | | | | | | | |
|---|---|---|---|---|---|---|---|---|---|---|
| Completed Asmnt | Student | All IEP | | | Default Date | 08/22/2002 | | Not in SETS | Search | |
| Latest IEP | Old IEP | Open Asmnt | | | | | | | | |
| New | Last Name | First Name | ID | DOB | Grade | Attn | Manag | Dev Date | Due Date | Srv Code |
| ▲ | AADAMSJR | AMY | 18 | 01/05/2000 | 43 | 201 | 201 | 02/08/2001 | 02/09/2001 | 1 |
| ✱ | AADAMSJR | AMY | 18 | 01/05/2000 | 43 | 201 | 201 | 02/08/2001 | 02/09/2001 | 4 |
| ✱ | ACHOR | AMY | 851 | 01/01/1991 | 05 | 201 | 201 | 05/14/2002 | 05/15/2002 | 1 |
| ✱ | ACHOR | AMY | 851 | 01/01/1991 | 05 | 201 | 201 | 05/14/2002 | 05/15/2002 | 13 |
| ✱ | ACHOR | AMY | 851 | 01/01/1991 | 05 | 201 | 201 | 05/14/2002 | 05/15/2002 | 5 |

Time Line & PPR
Lat. Start  02/09/2001
Act. Start
Act. End
Dly Reason

Service Info
Svc School  201
Provider  TEST, PROVIDER1
Clone Reason  Original Implementation aft
Session  8  per
Ind-Session  per

Session Time
Direct - Duration  1.00
Direct - Time Unit  Hours
Indirect - Duration
Indirect - Time Unit Last Updated  08/19/2002  at  11:13 AM  by  sa

Encounter Detail - CHECK BCPSS

Basic
Date  10/10/2001  Wed
Procedure Code  Family Counseling
Type  Worked With - Student
Service Given To  External: Parent/Guardian

Time/Other
Group Count  4
Provider  TEST, PROVIDER1
Rspns to Trth  Continue
Duration  Duration - 30 Minutes ress No

Encounter Tracking Report List

This report shows the summary of all the provider's student hours and sessions.

| ID | Report Name |
|---|---|
| 1 | Service Provider's Summary [For All Student] |
| 2 | Provider's Summary [For All Students Receiving Fewer Services Than Prescribed] |
| 3 | Provider's Summary [For All Students Receiving More Services Than Prescribed] |
| 4 | School Summary [For All Students] |
| 5 | School Summary [For All Students Receiving Fewer Services Than Prescribed] |
| 6 | School Summary [For All Students Receiving More Services Than Prescribed] |
| 7 | Provider Type Summary [For All Students] |
| 8 | Provider Type Summary [For All Students Receiving Fewer Services Than Prescribed] |

Report Criteria Set Up

Client: Baltimore City Public School System
School:
Area/District:
Interval: Week
Provider:

Encounter Date From:
Encounter Date To:

Print　Preview　Close

09/16/02 3:07 PM — Baltimore City Public School System — Page 1 of 1

Service Provider's Summary (For All Student) - School (Dummy School for Attending - 999)
Using Week Services
Encounter Date From 01/01/1999 To 01/01/2002

Svc Provider: THOMAS GREGG
Service Type: Classroom Instruction
School: 999-Dummy School for Attending

| Student Name | Grade | ID | DOB | Actual Start | Svc Required | Hours/Sessions Met | Attempted | Missed(F) | Made Up | Missing | Missing % |
|---|---|---|---|---|---|---|---|---|---|---|---|
| AA TEST, BPC | Kindergarten | 963 | 12/11/1995 | 6/10/1999 | 11 | | | | | | |
| | | | | | Sessions: 2.6 | 0.0 | 0.0 | 0.0 | 0.0 | 2.6 | 100.0% |
| | | | | | Hours: 1.0 | 0.0 | - 0.0 | 0.0 | 0.0 | 1.0 | 100.0% |
| School 999 Totals | | Students: 1 | | | | | | | | | |
| | | | | | Sessions: 2.6 | 0.0 | 0.0 | 0.0 | 0.0 | 2.6 | 100.0% |
| | | | | | Hours: 1.0 | 0.0 | 0.0 | 0.0 | 0.0 | 1.0 | 100.0% |
| Service Type Totals: | | Students: 1 | | | | | | | | | |
| | | | | | Sessions: 2.6 | 0.0 | 0.0 | 0.0 | 0.0 | 2.6 | 100.0% |
| | | | | | Hours: 1.0 | 0.0 | 0.0 | 0.0 | 0.0 | 1.0 | 100.0% |

Service Type: Speech/Language
School: 999 - Dummy School for Attending

| Student Name | Grade | ID | DOB | Actual Start | Svc Required | Hours/Sessions Met | Attempted | Missed(F) | Made Up | Missing | Missing % |
|---|---|---|---|---|---|---|---|---|---|---|---|
| FREEMAN, DIANE | Grade 2 | 465284 | 10/10/1994 | 12/18/2000 | 13 | | | | | | |
| | | | | | Sessions: 78.5 | 0.0 | 0.0 | 0.4 | 0.0 | 78.5 | 100.0% |
| | | | | | Hours: 2.0 | 0.0 | 0.0 | 1.0 | 0.0 | 2.0 | 100.0% |
| TEST BCPS, BUILD0620 | Grade 5 | | 1/15/1990 | 2/2/2000 | 13 | | | | | | |
| | | | | | Sessions: 157.0 | 0.0 | 0.0 | 0.0 | 0.0 | 157.0 | 100.0% |
| | | | | | Hours: 4.0 | 0.0 | 0.0 | 0.0 | 0.0 | 4.0 | 100.0% |
| School 999 Totals | | Students: 2 | | | | | | | | | |
| | | | | | Sessions: 235.5 | 0.0 | 0.0 | 0.4 | 0.0 | 235.5 | 100.0% |
| | | | | | Hours: 6.0 | 0.0 | 0.0 | 1.0 | 0.0 | 6.0 | 100.0% |
| Service Type Totals: | | Students: 2 | | | | | | | | | |
| | | | | | Sessions: 235.5 | 0.0 | 0.0 | 0.4 | 0.0 | 235.5 | 100.0% |
| | | | | | Hours: 6.0 | 0.0 | 0.0 | 1.0 | 0.0 | 6.0 | 100.0% |
| Provider Caseload: | | Students: 3 | | | | | | | | | |
| | | | | | Sessions: 238.1 | 0.0 | 0.0 | 0.4 | 0.0 | 238.1 | 100.0% |
| | | | | | Hours: 7.0 | 0.0 | 0.0 | 1.0 | 0.0 | 7.0 | 100.0% |
| Overall Caseload: | | Students: 3 | | | | | | | | | |
| | | | | | Sessions: 238.1 | 0.0 | 0.0 | 0.4 | 0.0 | 238.1 | 100.0% |
| | | | | | Hours: 7.0 | 0.0 | 0.0 | 1.0 | 0.0 | 7.0 | 100.0% |

Report Category - Encounter Tracking — Report ID #1

10/29/03 9:56 AM

Baltimore City Public School System
Service Provider's Summary (For All Student) - School (UAT Testing School - 995)
Using Week Services
Encounter Date From 01/01/2001 To 10/30/2003

Page 1 of 4

Svc Provider: SHARON PETTUS
Service Type:    Counseling Services
School:   995-UAT TESTING School

| Student Name | Grade | ID | DOB | Actual Start | Svc | Required | Met | Attempted | Missed(F) | Made Up | Missing | Missing % |
|---|---|---|---|---|---|---|---|---|---|---|---|---|
| | | | | | | | | Hours/Sessions | | | | |
| SEALFON, ANNE | Grade 9 | | 4/7/1988 | 9/4/2002 | 26 | | | | | | | |
| | | | | | Sessions: | 148.00 | 0.00 | 0.25 | 0.00 | 0.00 | 147.75 | 99.83% |
| | | | | | | 296.00 | 0.00 | 1.00 | 0.00 | 0.00 | 295.00 | 99.66% |
| School 995 Totals | | | | Students: 1 | Hours: | 148.00 | 0.00 | 0.25 | 0.00 | 0.00 | 147.75 | 99.83% |
| | | | | | Sessions: | 296.00 | 0.00 | 1.00 | 0.00 | 0.00 | 295.00 | 99.66% |
| Service Type Totals: | | | | Students: 1 | Hours | 148.00 | 0.00 | 0.25 | 0.00 | 0.00 | 147.75 | 99.83% |
| | | | | | Sessions: | 296.00 | 0.00 | 1.00 | 0.00 | 0.00 | 295.00 | 99.66% |

Service Type: Social Work Services
School:  995 - UAT Testing School

| Student Name | Grade | ID | DOB | Actual Start | Svc | Required | Met | Attempted | Missed(F) | Made Up | Missing | Missing % |
|---|---|---|---|---|---|---|---|---|---|---|---|---|
| | | | | | | | | Hours/Sessions | | | | |
| LIPMAN, ROGER | Grade 9 | 112222 | 10/12/1987 | 11/18/2002 | 29 | | | | | | | |
| | | | | | Sessions: | 296.00 | 0.50 | 0.00 | 0.00 | 0.00 | 147.50 | 99.66% |
| | | | | | | 296.00 | 1.00 | 0.00 | 0.00 | 0.00 | 295.00 | 99.66% |
| School 995 Totals | | | | Students: 1 | Hours: | 148.00 | 0.50 | 0.00 | 0.00 | 0.00 | 147.50 | 99.66% |
| | | | | | Sessions: | 296.00 | 1.00 | 0.00 | 0.00 | 0.00 | 295.00 | 99.66% |
| Service Type Totals: | | | | Students: 1 | Hours: | 148.00 | 0.50 | 0.00 | 0.00 | 0.00 | 147.50 | 99.66% |
| | | | | | Sessions: | 296.00 | 1.00 | 0.00 | 0.00 | 0.00 | 295.00 | 99.66% |
| Provider Caseload: | | | | Students: 2 | Hours: | 296.00 | 0.50 | 0.25 | 0.00 | 0.00 | 295.25 | 99.75% |
| | | | | | Sessions: | 592.00 | 1.00 | 1.00 | 0.00 | 0.00 | 590.00 | 99.66% |
| Overall Caseload: | | | | Students: 5 | Hours: | 814.00 | 1.75 | 1.00 | 0.00 | 0.00 | 811.25 | 99.66% |
| | | | | | Sessions: | 1480.00 | 4.00 | 3.00 | 0.00 | 0.00 | 1473.00 | 99.53% |

FIG. 18B

Service Gap Analysis - [Service Gap]

Algorithm

4GL School Solutions, Inc.

Report Option

Service Gap Analysis

| | Month | Expected (min) | Actual (min) | Shortfall (min) | Cumulative (min) | Session Exp. | Session |
|---|---|---|---|---|---|---|---|
| 1 | Provider: HUSSAIN, SHENAZ \| Service: Physical Therapy \| School: Dunbar Senior \| Student: ANDREWS, JAMEIKA | | | | | | |
| | Apr. 2001 | 30 | 0 | 30 | 30 | | 1 |
| 2 | Provider: HUSSAIN, SHENAZ \| Service: Physical Therapy \| School: Eastern Senior \| Student: BATTLE, KENISHA | | | | | | |
| | Apr. 2001 | 189 | 225 | -36 | -36 | | 4 |
| 3 | Provider: HUSSAIN, SHENAZ \| Service: Physical Therapy \| School: Fletcher-Johnson EC \| Student: BRANNON, TERRY | | | | | | |
| | Apr. 2001 | 126 | 120 | 6 | 6 | | 4 |
| 4 | Provider: HUSSAIN, SHENAZ \| Service: Physical Therapy \| School: Fletcher-Johnson EC \| Student: SMITH, KENISE | | | | | | |
| | Apr. 2001 | 126 | 90 | 36 | 36 | | 4 |
| 5 | Provider: HUSSAIN, SHENAZ \| Service: Physical Therapy \| School: Fletcher-Johnson EC \| Student: WHITTAKER, DELORES | | | | | | |
| | Apr. 2001 | 126 | 120 | 6 | 6 | | 4 |
| 6 | Provider: HUSSAIN, SHENAZ \| Service: Physical Therapy \| School: Gage-Eckington Elementary \| Student: HARPER, KYLE | | | | | | |
| | Apr. 2001 | 126 | 90 | 36 | 36 | | 4 |
| 7 | Provider: HUSSAIN, SHENAZ \| Service: Physical Therapy \| School: Gage-Eckington Elementary \| Student: SHORT, EVERETT | | | | | | |
| | Apr. 2001 | 126 | 120 | 6 | 6 | | 4 |
| 8 | Provider: HUSSAIN, SHENAZ \| Service: Physical Therapy \| School: Harris, C.W. Elementary \| Student: SHELTON, DAJON | | | | | | |
| | Apr. 2001 | 252 | 240 | 12 | 12 | | 4 |
| 9 | Provider: HUSSAIN, SHENAZ \| Service: Physical Therapy \| School: Harris, Patricia EC \| Student: CHILDS, TIERA | | | | | | |
| | Apr. 2001 | 126 | 150 | -24 | -24 | | 4 |
| | Apr. 2001 | 252 | 300 | -48 | -72 | | 4 |
| 11 | Provider: HUSSAIN, SHENAZ \| Service: Physical Therapy \| School: Harris, Patricia EC \| Student: RUSH, DAIJAHA | | | | | | |
| | Apr. 2001 | 126 | 180 | -54 | -54 | | 4 |

Send Mail   Config   Close   Quit

FIG. 23

ENCOUNTER TRACKER AND SERVICE GAP ANALYSIS SYSTEM AND METHOD OF USE

This application claims priority from U.S. Provisional Application Ser. No. 60/422,869 filed Nov. 1, 2002. The entirety of that provisional patent application is incorporated herein by reference.

BACKGROUND OF THE INVENTION

1. Field of the Invention

The present invention relates to a software based method and system for tracking and supporting compliance with a management scheme for individualized educational instruction, behavioral interventions or social interventions, and in particular to a software based method and system for tracking of, supporting compliance with, and otherwise assisting in determining whether an individual has received required services, analyzing service gaps, and using data provided in such determinations to assist in obtaining Medicaid or other reimbursements.

2. Background of the Technology

There is an unmet need in the art for methods and systems for the tracking of, supporting compliance with, and otherwise providing assistance in meeting requirements for the complex and sophisticated management schemes that institutions need to use in order to effectively and efficiently manage mandated individualized instructional paths, disciplinary/rehabilitative paths, or social intervention paths for hundreds if not thousands of students, juveniles, etc., simultaneously, all with different start and end dates, and different internal individualized management steps. For example, looking at mandated individualized instructional paths, it is not uncommon to find that a U.S. public K-12 school district may need to manage 30% or more of its student population under individualized instructional programs such as Special Education, 504, English Second Language, Early Intervention/Student Support Team, Gifted and Talented, or At Risk of Failing High Stakes Exit Exams. Each of these programs includes requirements involving events or meetings (such as Referrals, or Annual Meetings or Reevaluation Meetings), associated timeliness linked paperwork, and mandated outcomes.

Successful, consistent, legally compliant execution of these individualized programs by a school district requires the tight coordination of dozens of action steps across multiple team members for each affected child within relatively short time periods. Failure to effectively manage, what in many school districts may be thousands of individualized instructional paths going on simultaneously, significantly diminishes the education effectiveness of these interventions, exposes the district to serious legal liability for violating Federal and State law, risks loss of full Federal and State funding, and drives up a district's administrative overhead.

An individualized education plan (IEP), as required by the Individuals with Disabilites Education Act (IDEA), specifies services to be provided to children with disabilities. School districts or other entities responsible for carrying out the provisions of the IDEA must ensure that the services specified are actually provided, both for liability reasons under the Act and to obtain reimbursements, as appropriate, such as from Medicaid. However, determining the services actually provided by the provider is difficult for several reasons.

First, many problems can arise in determining the actual number of services that should be provided in a given time frame, and existing systems for supporting IDEA activities typically do not adequately address this issue. For example, the frequency of services is often designated on a monthly or weekly basis. However, these frequency designations often cause inconsistencies and confusion, for example, due to anomalies in calendar periods (e.g., determining how many weekly services are to be delivered in a month when a month has four weeks and one day; accounting for vacations, holidays, and other absences) and/or difficulties in calendars across a school system (e.g., reconciling services to be delivered following a child's move from one building operating on a school year calendar to another building operating on an annual calendar).

Yet another problem with prior art systems is that these systems typically track only positive encounters (i.e., service encounters that actually occur). This approach fails to allow the service provider to account fully for the service provider's efforts, however, since it fails to account for attempts to provide services for a child. It is important to account for the fact that the school district or other entity's legal obligation to provide services for the child may be met by making the service available for the child at a specified time and place, even though the child may fail to appear and receive that service.

For example, if a service provider is to provide two therapy encounters or sessions to a child each week, and a four week period is tracked, eight therapy sessions over the time period will be received. To identify any gaps in service actually provided, this theoretical eight sessions must be compared to the sum of both actual sessions provided and attempts to provide services. Thus, if six sessions are actually provided, and the provider attempted to provide services on one occasion, the actual gap in services should be one session. There is a need for a system that appropriately accounts for service attempts.

There is a further need for a system that accounts for responsibility identification. For example, if a child moves from building A to building B on a particular date, a service provider at building A may no longer be responsible for providing the service, yet be unaware of the move to the new building; similarly, a new service provider at building B may now be responsible for that child, but be unaware that the child is now present in building B and, likewise, unaware of the new responsibility.

In particular, existing IEP tracking systems typically track who the provider is for each child, but when a change in services occurs, the previous provider is simply overwritten. Further, no start or end date is typically tracked by provider. As a result, no audit trail or other appropriate accountability can be established with the existing systems.

With regard to reimbursement, currently, Medicaid recovery for IDEA services is obtained in one of two ways: 1) primarily, recovery occurs via paper-based submission for services (e.g., blank forms or forms with only the child's name are forwarded to individual providers to complete); or 2) electronic versions of the paper-based recovery system are used (e.g., "palm-pilot" based versions of paper systems). One key problem is lack of accountability: at any given time, school districts or other entities are not able to determine what providers have submitted documents for Medicaid recovery.

As a result, low recovery of Medicaid cost reimbursement occurs with the prior art for most districts or other entities. In general, this low recovery can be tracked to two key factors: 1) underreporting (e.g., service provider forgets to report, although the service has been provided); if the district or other entity is paper-based or semi-automated, it will never know that the event has occurred and has not been reported; every event of underreporting costs the district or other entity Medicaid cost reimbursement; and 2) underservicing (e.g., service provider should have seen child, but failed—for example, service provider sick; child changed buildings, and service provider was not told; service provider simply won't see child); underservicing costs the district or other entity Medicaid cost reimbursement, and also creates a severe liability for the district or other entity under state and/or federal law to provide compensatory damages for the child. The core issue for underreporting and underservicing is accountability. The district or other entity needs to know how many services a service provider provided or should have provided to each child.

There remains an unmet need for methods and systems that account for and assist with determining gaps in services required to be provided, such as services under the IDEA, and to assist with reimbursement of these services.

SUMMARY OF THE INVENTION

The present invention includes systems and methods for tracking the services provided to a student or other individual and for analyzing service gaps, as well as to assist in recovery of costs for such services. In one embodiment, the present invention can be used to assist in compliance with the IDEA.

The present invention is able to interface with other management systems, such as systems that provide features for allowing selection and recordation of the name of the actual provider legally responsible for each service delivered to a child at any time under the Individuals with Disabilities Education Act (IDEA). For example, one such management scheme referred to as the Special Education Tracking System (SETS), also provides for "cloning," which allows a substitute provider to be identified for particular child services, but with identical responsibilities to those of the previous provider, while removing responsibility for the replaced provider. A further feature of the SETS system is customizable scheduling, which allows the calendar to vary, for example, by building or other location. In addition, the SETS system provides an interface for the school district or other entity to track what school each child is registered in at any point in time.

Another example management system usable with the present invention is one or more data repositories (e.g., databases) associated with the components, which allow entry and interrelation of data among the components, and identification and completion of forms relating thereto. In one embodiment, the components are directed to activities relating to compliance, tracking, or other functions. In one embodiment relating to implementation for compliance with the IDEA, the components include the following: 1) compensatory/violations; 2) school and codes information; 3) event/meeting timelines and outcomes, planning and other information; 4) IEP tracking and information maintenance; 5) discipline information; and 6) student master information.

In conjunction with these management systems, in an embodiment of the present invention, a service plan is used that describes the services that are expected to be provided to an individual. In one embodiment, the individual is a student, and the service plan is an IEP that describes services to be provided to the student under the IDEA.

In one embodiment, encounters, or services provided, attempted, or missed, are input into a system and stored. The encounter information input into the system includes, for example, the service provider, the individual receiving the service, the procedure code, or type of service (such as, for example, family counseling, occupational therapy evaluation, or physical therapy treatment), the school or district, the duration of the encounter, the encounter type (such as, for example, the service provider worked with the student and teacher, the encounter was missed because the student was absent, the encounter was missed because the service provider was attending another meeting), and the result of the encounter (for example, the student met the goal, treatment should be continued, treatment should be modified, the student refused to work toward the goal).

The encounter information in the system can then be compared to the expected services described in the service plan. The results of this comparison are used, for example, to generate a service gap analysis report, which calculates the shortfall or excess of services provided. Service gap analysis reports may be generated to find a shortfall or excess of services provided within a given period for a particular student, a particular service provider, a particular school or district, a particular individual education plan, or some combination thereof. In one embodiment, the shortfall or excess is reported in hours and fractions of hours.

The encounter information in the system can also be used in conjunction with reimbursement functions. For example, encounter information can be used to automatically generate a bill, which is optionally electronically transmitted to a reimbursement entity, such as a state government office.

Additional advantages and novel features of the invention will be set forth in part in the description that follows, and in part will become more apparent to those skilled in the art upon examination of the following or upon learning by practice of the invention.

BRIEF DESCRIPTION OF THE FIGURES

In the figures:

FIG. 3 is an example GUI screen shot for encounter tracker functions, in accordance with an embodiment of the present invention;

FIG. 4 is an example GUI screen shot for encounter tracker functions, in accordance with an embodiment of the present invention;

FIG. 5 is an example GUI screen shot for encounter tracker functions, in accordance with an embodiment of the present invention;

FIG. 6 is an example GUI screen shot for encounter tracker functions, in accordance with an embodiment of the present invention;

FIG. 7 is an example GUI screen shot for encounter tracker functions, in accordance with an embodiment of the present invention;

FIG. 8 is an example GUI screen shot for encounter tracker functions, in accordance with an embodiment of the present invention;

FIG. 9 is an example GUI screen shot for encounter tracker functions, in accordance with an embodiment of the present invention;

FIG. 10 is an example GUI screen shot for encounter tracker functions, in accordance with an embodiment of the present invention;

FIG. 16 is an example GUI screen shot for encounter tracker functions, in accordance with an embodiment of the present invention;

FIGS. 18 A–B are example GUI screen shots for encounter tracker functions, in accordance with an embodiment of the present invention;

FIG. 23 is an example GUI screen shot service gap analysis, in accordance with an embodiment of the present invention.

DETAILED DESCRIPTION

Figure 1:
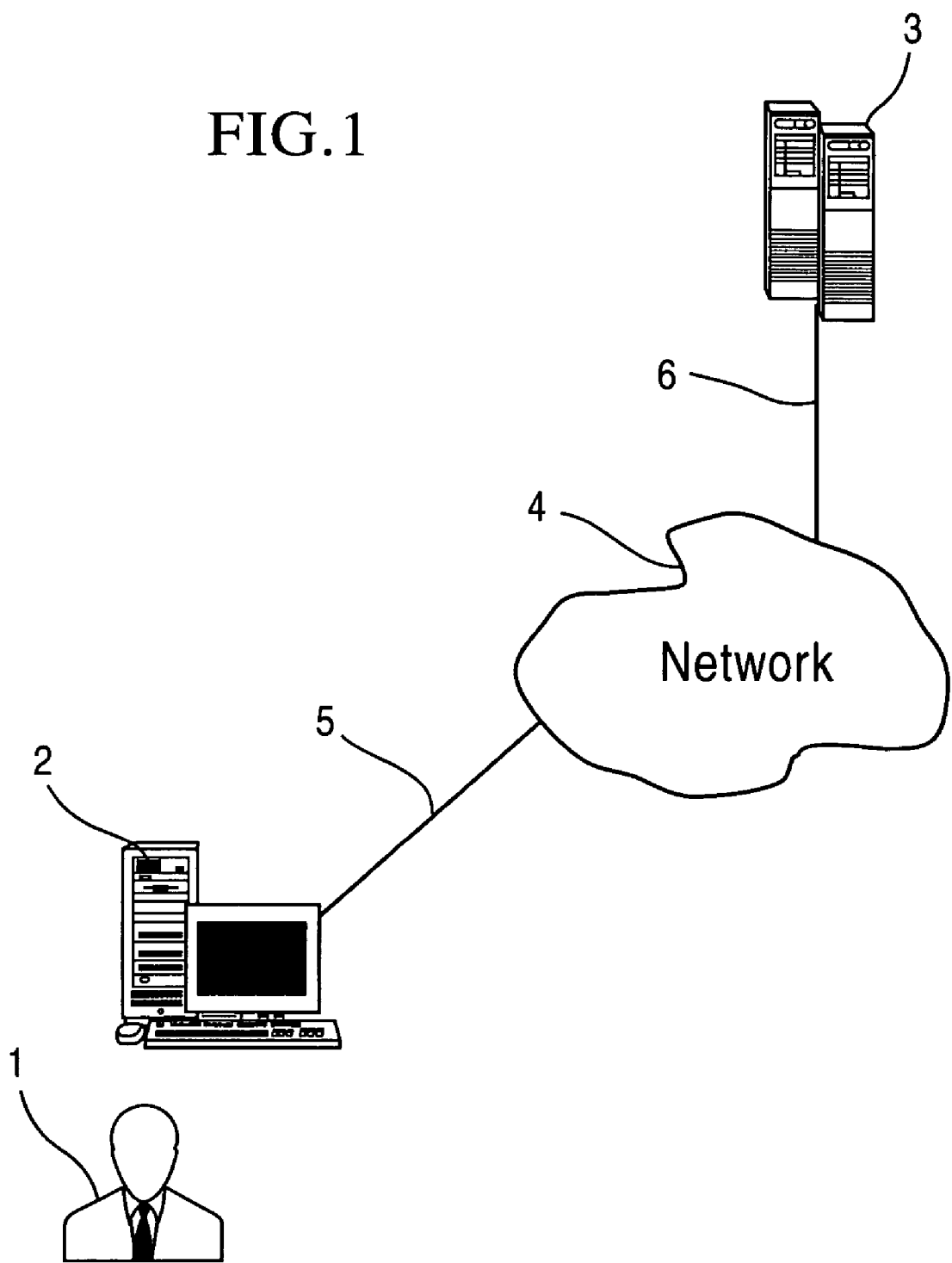
FIG. 1 presents an exemplary system diagram of various hardware components and other features in accordance with an embodiment of the present invention.

The present invention provides a system and method for tracking whether an individual has received required services and for analyzing service gaps, as well as assisting with reimbursements relating thereto. In one exemplary embodiment, the present invention tracks special education students to ensure that they receive services that have been designated as appropriate for them. In an embodiment of the present invention, a service plan, such as, for example, an IEP, describes the services that are expected to be provided to an individual, such as a student. The service plan contains one or more service details. Each service detail describes, for example, a service that is expected to be provided, the service provider responsible for providing the service, and the duration and frequency of the expected service. For example, a service detail, such as an IEP detail, specifies that service provider Mary Smith is responsible for providing physical therapy sessions twice a week, each session lasting 30 minutes. If the service plan is an IEP, the service details contained in the service plan are referred to as IEP details. Other types of service details and other types of service plans exist and are usable in conjunction with the present invention.

In one embodiment of the present invention, when a service is attempted or provided to any individual by any provider, or when a service is missed, this information is input into a system and maintained electronically. The input information is referred to interchangeably as an encounter or a session. Once the information is entered, it can be analyzed to ensure that the services provided correspond with the IEP or other service plan, and gaps in services can be determined, such as by use of the service gap analysis feature, along with information from other systems and methods. The system also provides functionality to export encounter information for billing purposes.

Various features of the present invention are disclosed in or interact with one or more features of applicant's following copending provisional and utility patent applications: U.S. patent application Ser. No. 10/406,246 filed Apr. 4, 2003, titled "Method and System for Online Analytical Processing for Educational and Other Outcomes"; U.S. patent application Ser. No. 10/628,790 filed Aug. 27, 2003, titled "Method and System for Compliance Forms and Compliance Forms User Interface"; and U.S. patent application Ser. No. 60/477,346 filed Jun. 11, 2003, titled "Management Tracking and Forms System and Method of Use." The entirety of each of these patent applications is incorporated herein by reference.

SETS System Interface

The present invention includes multiple levels of functionality that address the issue of accountability, for both underreporting and underservicing. In one embodiment, the present invention interacts with the invention that is the subject of applicant's copending U.S. patent application Ser. No. 10/455,804 filed Jun. 6, 2003, titled "Special Education Tracking System and Method of Use" (also interchangeably referred to as Special Education Tracking System and referred to hereinafter "SETS system" ), which is hereby incorporated by reference. To assist with compliance with the IDEA, the SETS system includes tracking of services provided within IEPs. The SETS system includes features that allow recordation of the name of the actual provider legally responsible for each service delivered to a child at any time under the IDEA.

In particular, the IEP records within the SETS system include three tiers of information. The third tier of the SETS process includes an option to select a provider automatically for each child, such as by linking a provider to the child via the building in which the child and the provider are located. Thus, a responsible provider is automatically selected and in place at all times for each child, based, for example, on the child's location. If the option to select a provider automatically for each child is not chosen by the particular school district or other entity (e.g., the district or other entity chooses to link the child to the provider manually), the SETS system provides for district or other entity manual selection of a provider for each child and each service. In both the automated and the manual modes, the SETS system thus ensures that a particular provider is identified at all times for each child service provided.

Another feature of the SETS system that is relevant to the present invention is referred to as "cloning," which allows a substitute provider to be identified for particular child services, but with identical responsibilities to those of the previous provider, while removing responsibility for the replaced provider. Thus, for example, when a provider must be absent (e.g., on sick leave), a cloned replacement provider can be identified under the SETS system to be responsible for the same services as the absent provider (rather than, for example, either not recording the substitution or manually substituting during the absence and then again upon return of the designated provider). As a result, this feature ensures that a particular provider is identifiable at all times for each child service, regardless of the presence or absence of any one particular provider in the system.

Yet another unique feature of the SETS system that is of importance to the present invention is customizable scheduling, which allows the calendar to vary, for example, by building or other location. A critical component of many school districts or other entities is variation in schedule by building (e.g., school year versus calendar year, depending on building). Because of this feature of the SETS system, a theoretical calculation can be made of the level of services that should be provided to each child by each provider, based, for example, on the amount of time that the child is scheduled to be in each building and the amount of services the child is scheduled to receive under that child's IEP. For example, if a child is to receive a certain type of therapy twice a week, and the child is determined to be located in a particular building and having a particular service provider for that therapy, over a four week period the child should theoretically receive eight units of the therapy by the identified service provider in that building.

The SETS system also provides an interface for the school district or other entity to track the school in which each child is registered at any point in time. One reason that maintenance of this information is significant is because service providers are often not told that a child has left the system or is no longer present for services in the building in which the service provider is located. Absent this feature of the SETS system, a great deal of time may pass before the service provider becomes aware of the provider's change in responsibilities toward the child who has left the system or building, while identification of a new provider for that child may similarly be delayed. Regardless of these difficulties, however, the district or other entity is responsible for ensuring that continuous services are provided to each child. The tracking interface of the SETS system provides a tool for meeting this responsibility.

Encore System Interface

The present invention includes multiple levels of functionality that address the issue of accountability, for both underreporting and underservicing. In one embodiment, the present invention interacts with the invention that is the subject of applicant's copending provisional U.S. patent application Ser. No. 60/477,346 filed Jun. 11, 2003, titled "Management Tracking and Forms System and Method of Use," also referred to herein interchangeably as the "Encore system." The Encore system includes a database structure and platform, as well as a code authoring tool, referred to in one embodiment as a "workbench," for assisting users with developing code in an automated fashion for use with the database structure and platform.

The Encore system provides one or more data repositories (e.g., databases) associated with the components, which allow entry and interrelation of data among the components, and identification and completion of forms relating thereto. In one embodiment, the components are directed to activities relating to compliance, tracking, or other functions. In one embodiment relating to implementation for compliance with the IDEA, the components include the following: 1) compensatory/violations; 2) school and codes information; 3) event/meeting timelines and outcomes, planning and other information; 4) IEP tracking and information maintenance; 5) discipline information; and 6) student master information.

One embodiment of the Encore system further provides a method and system for rapidly tailoring or customizing compliance requirements and other functions for each management entity. The Encore system provides a database structure and platform for rapidly configuring/customizing the database structure to mirror the school district's or county's or state's agreed upon business process surrounding meeting/events, timelines, outcomes, and associated paperwork.

For example, the Encore system allows the management method and system to be initially tailorable/configurable to the requirements of a particular school district or other management entity maintaining information. Tailoring includes determining a management entity's data options and rules, appropriately identifying any corresponding data options and rules in a master repository linking the corresponding data options and rules, and adding, as necessary, each data option and rule of the management entity's particular scheme for implementation. The tailored system is then used to assist with compliance and tracking of information for the customized management scheme.

In embodiments of the Encore system, the user is able to select to have a compliance check performed on forms in the system to determine the status of the forms. The Encore system evaluates information completed and missing, or that is incomplete, for each form, and forms for which outstanding items remain to be completed fail the compliance check.

Encounter Tracking Feature

The SETS and Encore systems, for example, thus provide a theoretical basis of information for use by the present invention in performing gap analysis of services to be provided to each child, versus services actually delivered by each service provider. One feature of the present invention, referred to in one embodiment as "Encounter Tracker," provides functions for inputting information on actual services provided and attempted provision of services, as a second necessary component, along with the SETS or Encore system information, to perform such gap analysis. Another purpose of this encounter tracking feature is to provide to each service provider an accessible list of children or other tracked individuals for whom the service provider is legally accountable for providing specified services. This feature thus provides the service provider with a real-time caseload of services and serviced individuals.

Thus, for example, when a child changes buildings, this change in services for both the provider formerly servicing the child and a newly identified provider who will continue servicing the child is immediately highlighted for each service provider. In one embodiment of the present invention, new additions to the service provider workload are further highlighted by appearing in a special color, such as red, within the system.

These features of the present invention therefore allow the school district or other entity to become more efficient in terms of identifying and linking children to specific service providers at all times, and also help districts or other entities to ensure compliance with corresponding legal requirements relating to services that must be provided to each child.

Another advantage of the present invention is that it allows each service provider to identify at any time, via accessing of the system (e.g., online for network based variations), each child for whom the service provider has actually provided services. In an embodiment of the present invention, the input of actual services provided is referenced against the caseload for the service provider. In an embodiment of the present invention, GUI allows the service provider to select a child from a list of children for whom the service provider provides services, so that a list of scheduled services to be provided, along with those that have actually been provided can be immediately identified and reviewed by the service provider.

In an embodiment of the present invention, all information input and viewed by the service provider to the system is code driven (e.g., input and viewed by diagnostic code, intervention code), allowing the service provider to report an encounter fully using only a few keystrokes (i.e., minimizing data entry time). Valid codes and code combinations are tailored to the state plan. In addition, the service provider is able to select to automatically default the data in the report to that contained in the previous report or in the profile for the child, allowing even further reduction in effort to prepare each report.

Service Gap Analysis Feature

An embodiment of the present invention allows the service provider to periodically (e.g., monthly) run a service gap analysis report based on the SETS or Encore system information and the encounter tracking feature information. The report can include both negative gaps, showing shortfalls, and positive gaps, showing services greater than the expected number, along with combined totals over longer or combined periods (e.g., a short week or month may indicate a partial service is to be provided, which may occur during that time period or in the subsequent time period, producing either a positive over service or a negative gap, respectively, for that time period, which collectively balance out).

In an embodiment of the present invention, information from each month or other selected time period is analyzed to determine any gap in the amount of services delivered during that month. These services are defined as the combined number of actual delivered services and services that were attempted to be delivered. In addition, surpluses and deficits from succeeding periods are added together to provide an overall deficit or surplus that a provider for a child has for a given period of time.

An embodiment of the present invention also includes an option for the service provider to correct any reporting errors within the report produced (e.g., a service provider can correct an accidental failure to include a service provided), providing that the encounter has not been exported for billing.

As a further check within an internal audit process of an embodiment of the present invention, for use, for example, with IDEA requirements, input information on services provided or attempted is compared to attendance records for each child (e.g., the school's attendance record for the child is checked against each date that the service provider indicates that services were provided, in order to ensure that the child was actually present in the building the day the services were supposedly provided). Similarly, records as to actual presence of the service provider at the school can be compared to service provision information as a further audit of service provider input.

Service Gap Analysis OLAP Feature

Another feature of the present invention relates to interaction with features of the invention that is the subject of applicant's copending U.S. patent application Ser. No. 10/406,246, filed Apr. 4, 2003, titled "Method and System for Online Analytical Processing for Educational and Other Outcomes" (hereinafter "OLAP system" ). An embodiment of the OLAP system includes a selected set of interrelated areas or fields, referred to as a "cube," relating to data for the present invention. This OLAP system cube allows overview analysis of information obtained from the present invention, such as identification of providers having missed encounters greater than a predetermined threshold (e.g., more than two missed sessions over a given time period). The school district or other entity can thus quickly identify problems with service providers or otherwise with regard to failed provision of services, and thus also manage, for example, reimbursement and legal compliance risk. One benefit of the service gap analysis feature of the present invention is that it identifies shortfalls and provides information about the shortfalls.

In an embodiment of the present invention, the data from the service provider input information on service encounters is usable with Medicaid or other reimbursement services to produce documents for submission for reimbursement.

References will now be made in detail to an embodiment of the present invention, an example of which is illustrated in the accompanying drawings.

As shown in FIG. 1, in an embodiment of the present invention, data for use in the system is, for example, obtained by a user 1 via a terminal 2, such as a personal computer (PC), minicomputer, mainframe computer, microcomputer, telephonic device, or wireless device, such as a hand-held wireless device coupled to a server 3, such as a PC, minicomputer, mainframe computer, microcomputer, or other device having a processor and a repository for data or connection to a repository for data, via a network 4, such as the Internet or an intranet, and couplings 5, 6. The couplings 5, 6 include, for example, wired, wireless, or fiberoptic links. In another embodiment, the method and system of the present invention operate in a stand-alone environment, such as on a single terminal.

Figure 2:
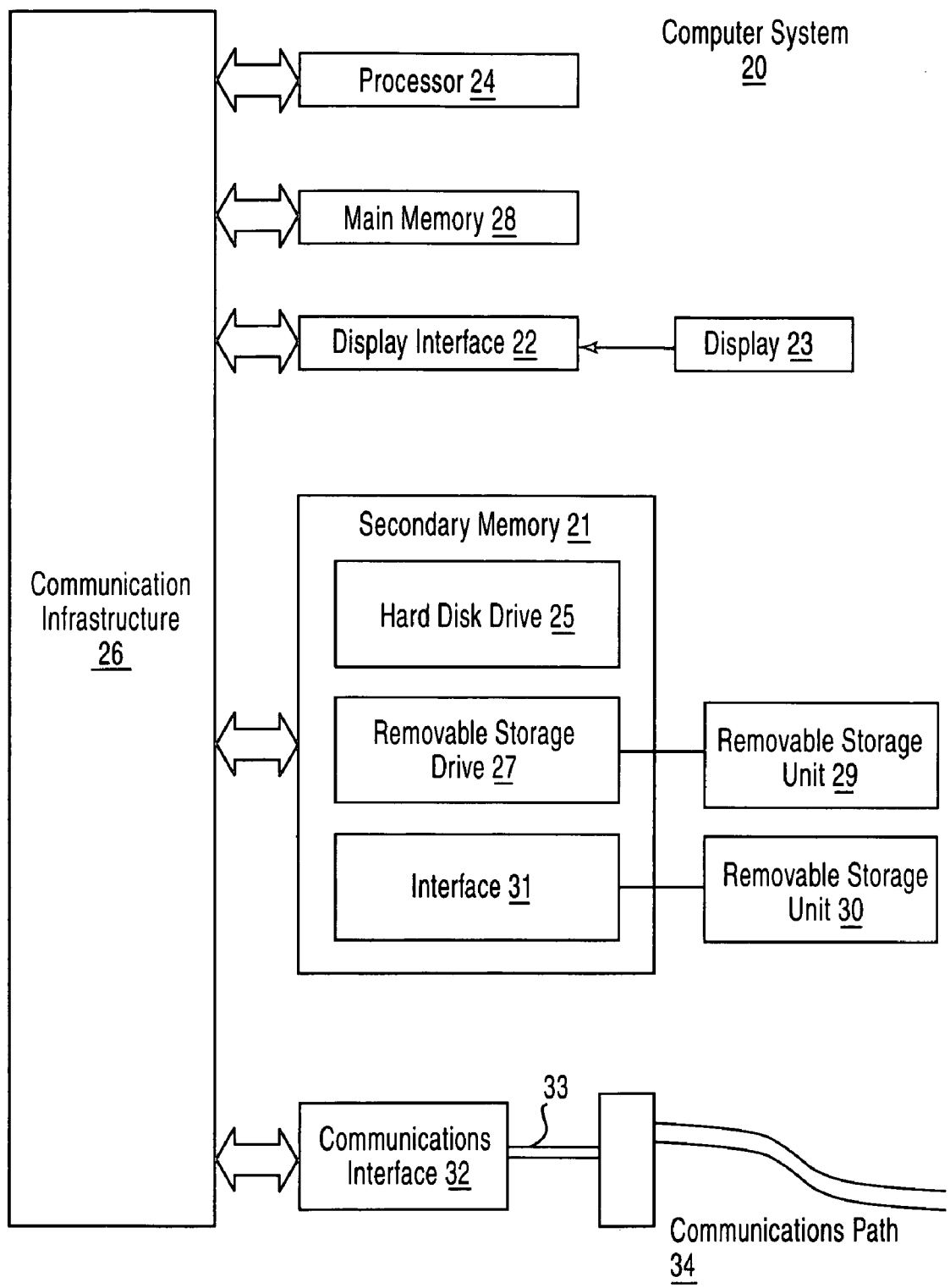
FIG. 2 is a block diagram of various system components, in accordance with an embodiment of the present invention.

The present invention may be implemented using hardware, software or a combination thereof and may be implemented in one or more computer systems or other processing systems. In one embodiment, the invention is directed toward one or more computer systems capable of carrying out the functionality described herein. An example of such a computer system 20 is shown in FIG. 2.

Computer system 20 includes one or more processors, such as processor 24. The processor 24 is connected to a communication infrastructure 26 (e.g., a communications bus, cross-over bar, or network). Various software embodiments are described in terms of this exemplary computer system. After reading this description, it will become apparent to a person skilled in the relevant art(s) how to implement the invention using other computer systems and/or architectures.

Computer system 20 can include a display interface 22 that forwards graphics, text, and other data from the communication infrastructure 26 (or from a frame buffer not shown) for display on the display unit 23. Computer system 20 also includes a main memory 28, preferably random access memory (RAM), and may also include a secondary memory 21. The secondary memory 21 may include, for example, a hard disk drive 25 and/or a removable storage drive 27, representing a floppy disk drive, a magnetic tape drive, an optical disk drive, etc. The removable storage drive 27 reads from and/or writes to a removable storage unit 29 in a well known manner. Removable storage unit 29, represents a floppy disk, magnetic tape, optical disk, etc., which is read by and written to removable storage drive 27. As will be appreciated, the removable storage unit 29 includes a computer usable storage medium having stored therein computer software and/or data.

In alternative embodiments, secondary memory 21 may include other similar devices for allowing computer programs or other instructions to be loaded into computer system 20. Such devices may include, for example, a removable storage unit 30 and an interface 31. Examples of such may include a program cartridge and cartridge interface (such as that found in video game devices), a removable memory chip (such as an erasable programmable read only memory (EPROM), or programmable read only memory (PROM)) and associated socket, and other removable storage units 30 and interfaces 31, which allow software and data to be transferred from the removable storage unit 30 to computer system 20.

Computer system 20 may also include a communications interface 32. Communications interface 32 allows software and data to be transferred between computer system 20 and external devices. Examples of communications interface 32 may include a modem, a network interface (such as an Ethernet card), a communications port, a Personal Computer Memory Card International Association (PCMCIA) slot and card, etc. Software and data transferred via communications interface 32 are in the form of signals 33, which may be electronic, electromagnetic, optical or other signals capable of being received by communications interface 32. These signals 33 are provided to communications interface 32 via a communications path (e.g., channel) 34. This path 34 carries signals 33 and may be implemented using wire or cable, fiber optics, a telephone line, a cellular link, a radio frequency (RF) link and/or other communications channels. In this document, the terms "computer program medium" and "computer usable medium" are used to refer generally to media such as a removable storage drive 27, a hard disk installed in hard disk drive 25, and signals 33. These computer program products provide software to the computer system 20. The invention is directed to such computer program products.

Computer programs (also referred to as computer control logic) are stored in main memory 28 and/or secondary memory 21. Computer programs may also be received via communications interface 32. Such computer programs, when executed, enable the computer system 20 to perform the features of the present invention, as discussed herein. In particular, the computer programs, when executed, enable the processor 24 to perform the features of the present invention. Accordingly, such computer programs represent controllers of the computer system 20.

In an embodiment where the invention is implemented using software, the software may be stored in a computer program product and loaded into computer system 20 using removable storage drive 27, hard drive 25, or communications interface 32. The control logic (software), when executed by the processor 24, causes the processor 24 to perform the functions of the invention as described herein. In another embodiment, the invention is implemented primarily in hardware using, for example, hardware components, such as application specific integrated circuits (ASICs). Implementation of the hardware state machine so as to perform the functions described herein will be apparent to persons skilled in the relevant art(s).

In yet another embodiment, the invention is implemented using a combination of both hardware and software.

FIGS. 3–10 illustrate sample GUI screens that are displayed to a user when a user enters a new encounter into the system.

FIG. 3 is an example GUI screen shot that lists information for one or more students. The user selects "Encounters" to activate the encounter tracking functionality.

FIG. 4 is an example GUI screen shot that is displayed after a user selects "Encounters" from the GUI of FIG. 3. The user selects "Search" to select and search through students serviced. FIG. 4 also includes a "Not in SETS" button that a user may select to enter encounter information for a student who is not entered into the system, or to otherwise enter encounter information that the system would not be able to store. In one embodiment, the information stored after a user selects "Not in SETS" is stored separately from the other encounter information, and requires user followup to determine further action.

FIG. 5 is an example GUI screen that is displayed after a user selects "Search" from the GUI of FIG. 4. The user enters one or more search criteria, such as, for example, school type, school name, service provider, or IEP service. The user may enter these search criteria, for example, by typing in a field or by selecting from a pull-down menu. The user then selects "Search" to activate the search functionality.

FIG. 6 is an example GUI screen that is displayed after a user enters one or more search criteria and selects "Search" from the GUI of FIG. 5. The user selects "Encounter Detail" to activate the encounter input functionality. The application can be configured to enable searching, or to display those children assigned to a certain provider, depending, for example, on the user.

Figure 8:
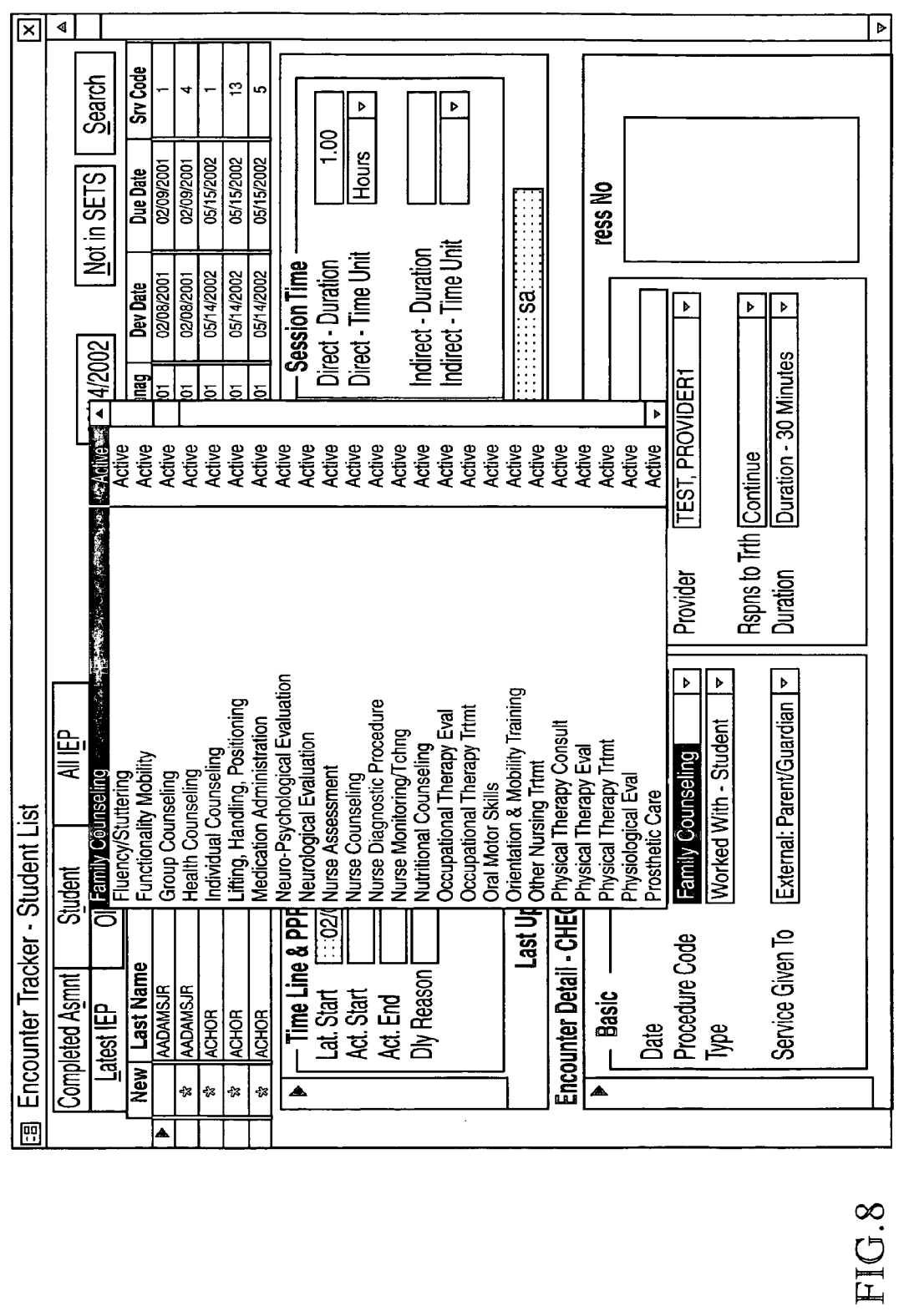
Figure 9:
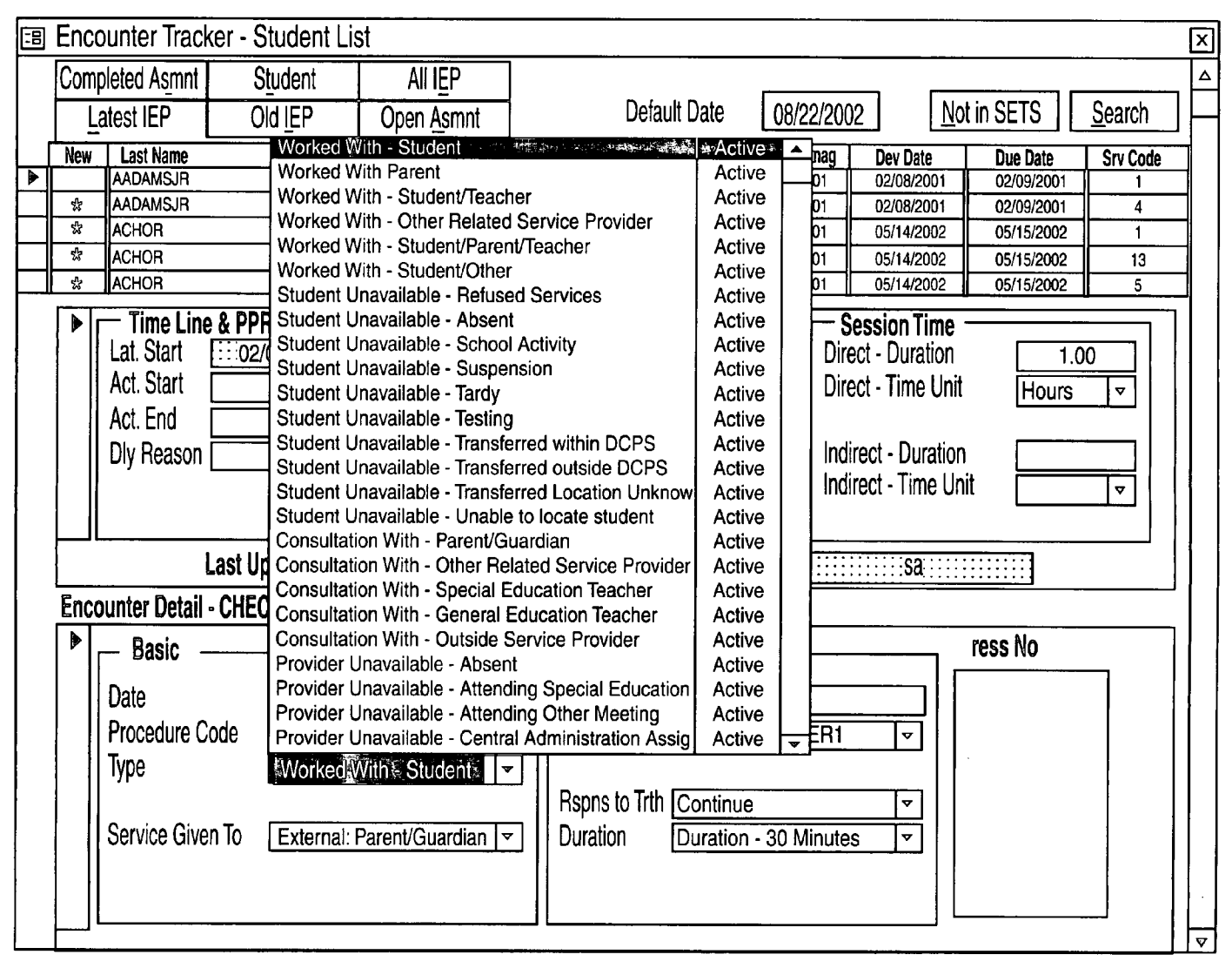
Figure 10:
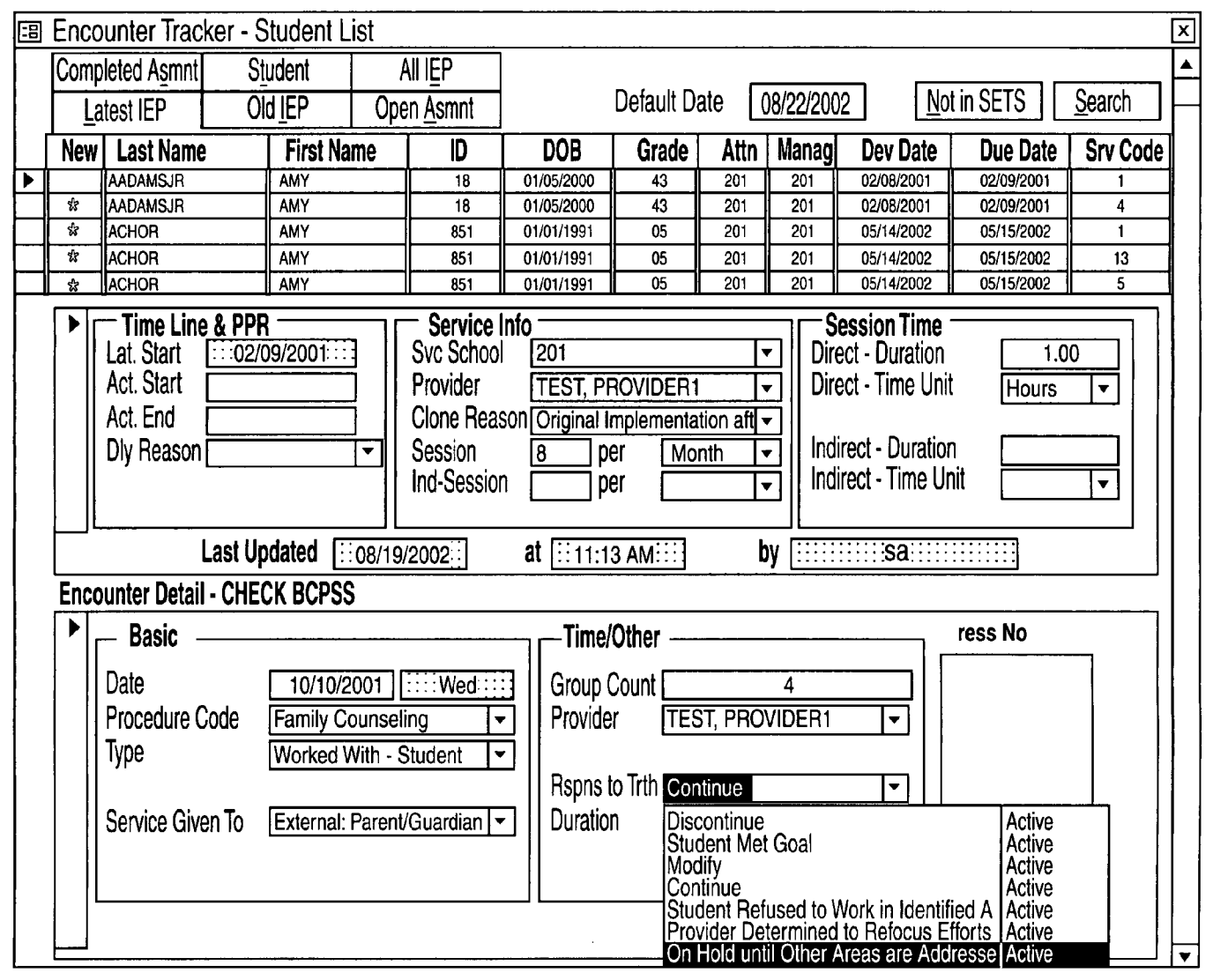

FIGS. 7–10 are example GUI screen shots for encounter tracker functions, in accordance with an embodiment of the present invention. The screen shot of FIG. 7 is displayed, for example, after a user selects "Encounter Detail" from the GUI of FIG. 6. The user verifies the IEP information. In one embodiment of the present invention, the IEP must be valid for the date of the encounter and the system will not permit a user to enter an encounter for an expired or otherwise invalid IEP. The user enters information relating to the encounter or service that was provided, attempted, or missed. The information entered by the user includes, for example, information relating to the service provider, or information relating to the procedure code, or type of service (such as, for example, family counseling, occupational therapy evaluation, or physical therapy treatment), as shown in FIG. 8. The information entered by the user also includes, for example, the encounter type (such as, for example, the service provider worked with the student and teacher, the encounter was missed because the student was absent, the encounter was missed because the service provider was attending another meeting), as shown in FIG. 9. The information entered by the user also includes, for example, the result of the encounter (for example, the student met the goal, treatment should be continued, treatment should be modified, the student refused to work toward the goal), as shown in FIG. 10. The user may enter the encounter information, for example, by typing in a field or by selecting from a pull-down menu. Information also includes, for example, the duration of the encounter.

Figure 11:
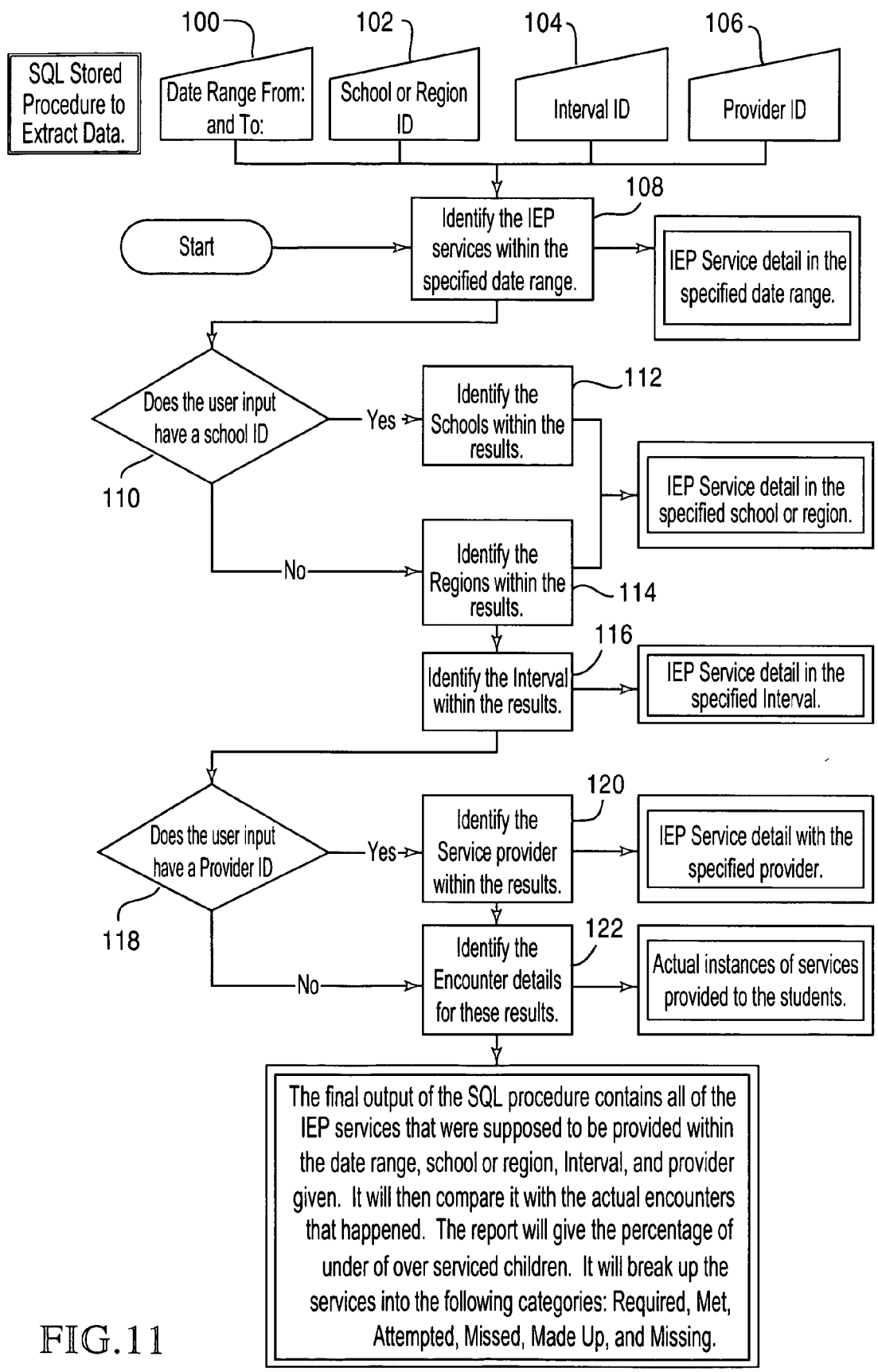
FIG. 11 is a flow diagram illustrating data flow for encounter tracker functions, in accordance with an embodiment of the present invention.

FIG. 11 is a flow diagram illustrating data flow for encounter tracker reporting and gap analysis functions, in accordance with an embodiment of the present invention. FIG. 11 illustrates one possible implementation of a method to extract encounter data. The method of FIG. 11 can be implemented, for example, as one or more Structured Query Language (SQL) queries made to a database. Other implementations are possible.

The data flow begins, for example, with search criteria. The search criteria may be input, for example, by a user. The search criteria include such information as a date range 100, a school and/or region identification 102, an interval identification 104, or a service provider identification 106.

In step 108, the IEP services within the specified date range are identified. The resulting data are, for example, an IEP Service detail for services in the specified date range.

In one implementation, the user may input either a school identification or a region identification, but not both. In this implementation, in step 110, it is determined whether the user input includes a school identification. If the user input includes a school identification, in step 112, the resulting data are searched for the specified school identification. If the user input does not include a school identification, in step 114, the resulting data are searched for the specified region identification. The resulting data are now, for example, an IEP Service detail for services in the specified date range with the specified school or region identification.

In step 116, the resulting data are searched for the specified interval. The resulting data are now, for example, an IEP Service detail for services in the specified date range with the specified school or region identification for the specified interval.

In step 118, it is determined whether the user input includes a provider identification. If the user input includes a provider identification, in step 120, the resulting data are searched for the specified provider identification. The resulting data are now, for example, an IEP Service detail for services by the specified school or region for the specified interval, with the specified provider.

In step 122, the encounter details for the resulting data are identified. The resulting data are now, for example, an IEP Service detail for services actually provided in the specified date range with the specified school or region identification for the specified interval, with the specified provider.

The resulting data from step 120 contains all of the IEP services that were supposed to be provided for the specified data range, school or region, interval, and provider. The resulting data from step 122 contains all of the IEP services that were actually provided for the specified data range, school or region, interval, and provider. The resulting data from step 120 are compared to the resulting data from step 122 to determine which expected services were actually provided. A report is generated detailing which expected services were actually provided. The report includes, for example, the percentage of under- or over-serviced children. The report also includes, for example, the number of required, met, attempted, missed, made up, or missing services.

Figure 12:
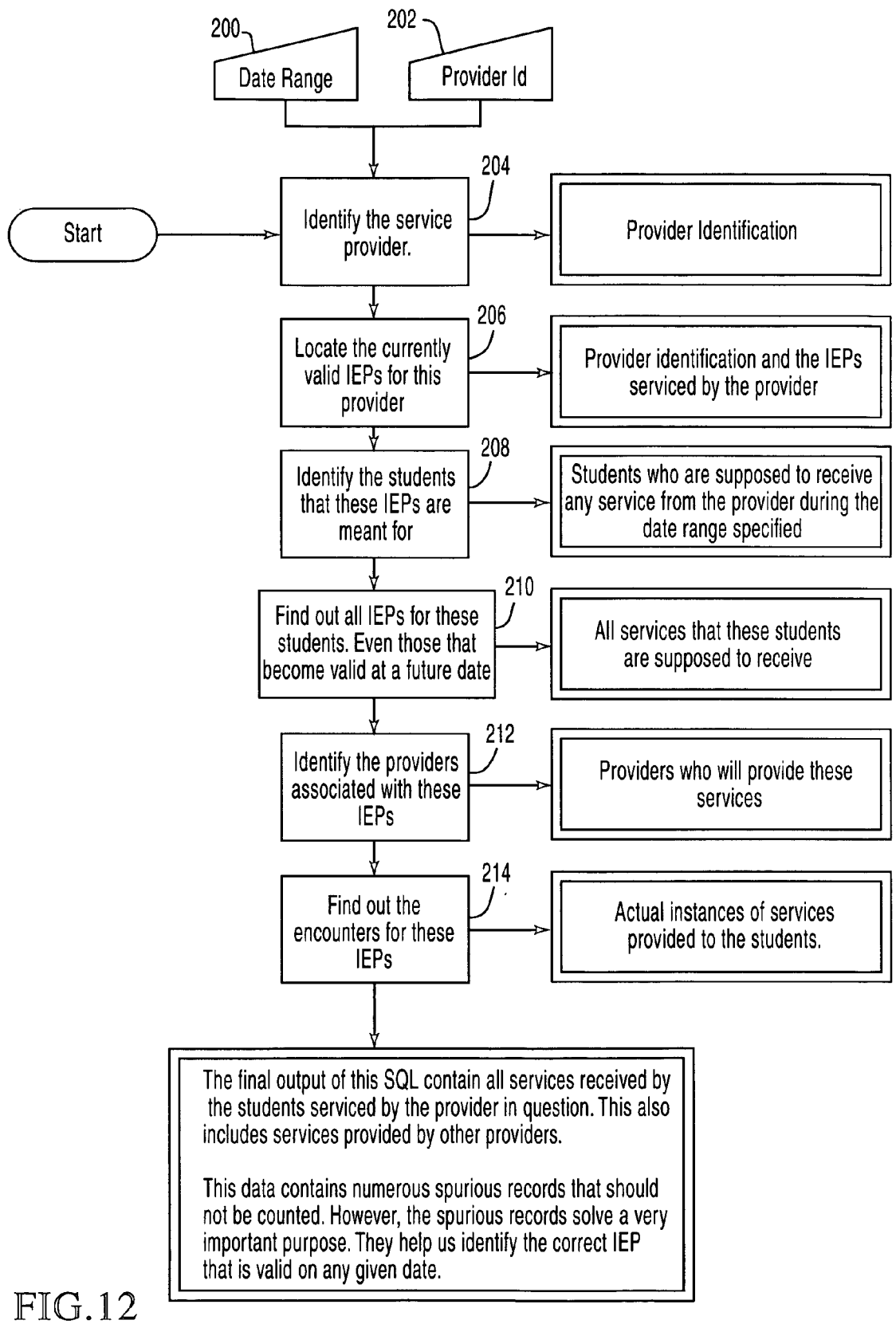
FIG. 12 is a flow diagram illustrating data flow for encounter tracker functions, in accordance with an embodiment of the present invention.

FIG. 12 is a flow diagram illustrating data flow for encounter tracker reporting and gap analysis functions, in accordance with an embodiment of the present invention. FIG. 12 illustrates one possible implementation of a method to extract encounter data. The method of FIG. 12 can be implemented, for example, as one or more SQL queries made to a database. Other implementations are possible.

The data flow begins, for example, with a user inputting search criteria. The search criteria input by the user include such information as a date range 200 and a provider identification 202.

In step 204, the service provider is identified. The resulting data now include, for example, data identifying the service provider.

In step 206, the IEPs for the service provider are identified. The resulting data now include, for example, data identifying the service provider and the IEPs serviced by the service provider.

In step 208, the students that these IEPs are meant for are identified. The resulting data now include, for example, data identifying the students who were supposed to receive any services from the provider during the specified date range.

In step 210, all IEPs for these students are identified. This includes IEPs that become valid at a future date. The resulting data now include, for example, all services that these students are supposed to receive.

In step 212, the service providers for the IEPs are identified. The resulting data now include, for example, all service providers who will provide services for these students.

In step 214, the encounters for the IEPs are identified. The resulting data now include, for example, actual instances of services provided to students.

The final output data contains all of the IEP services that were received by students serviced by the specified provider. This also includes services provided by other service providers. The final output data may also contain spurious records that should not be counted as services provided. However, the spurious records can be used to identify the IEP that is valid on a given date.

Figure 13:
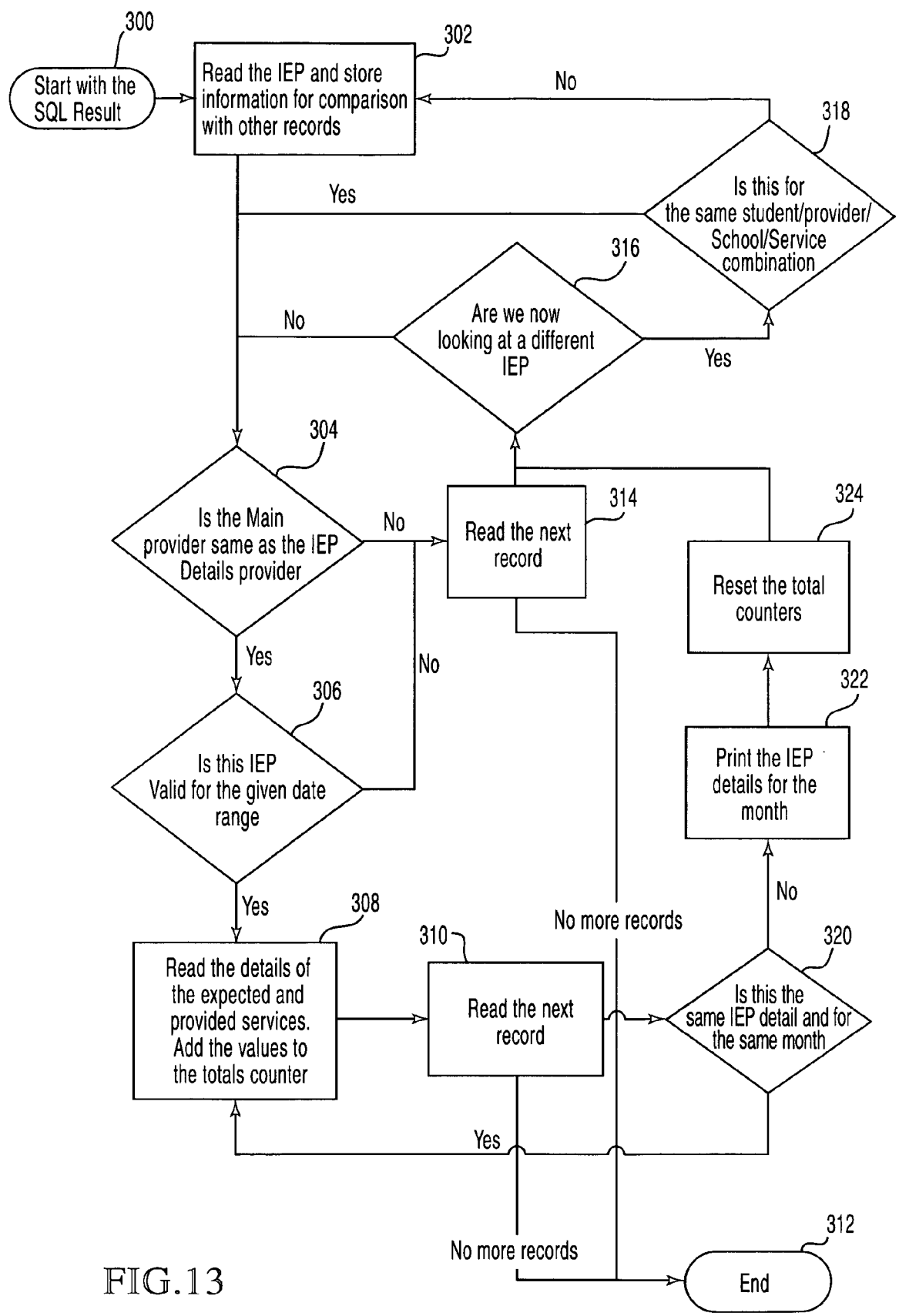
FIG. 13 is a flow diagram illustrating data flow for encounter tracker functions, in accordance with an embodiment of the present invention.

FIG. 13 is a flow diagram illustrating data flow for further encounter tracker functions, in accordance with an embodiment of the present invention. The method of FIG. 13 counts the services provided for a particular IEP by a particular provider in a given date range. In one embodiment, a report of services provided is output.

The method begins in step 300 when SQL results are received, determined, or otherwise provided. The SQL results are, for example, data results of the method of FIG. 11 or of FIG. 12. In implementations, the SQL results are sorted, such that, for example, all records for a given IEP are received one after the other.

In step 302, an IEP record is read and information is stored. The stored information includes, for example, IEP, student, service provider, school, and service information. The stored information is used to compare this record to subsequent records, in order to calculate total services provided for a given IEP. In step 304, it is determined whether the main or specified service provider is the same as the IEP details service provider, or the provider that was expected to provide the services.

If It Is determined that the main provider is the same as the IEP details service provider, in step 306, it is determined whether the IEP is valid for the specified date range.

If it is determined that the IEP is valid for the specified date range, in step 308, the details of the expected and provided services are read. The number of services provided for the services provided or attempted are then added to the totals counter.

In step 310, the next record is read. It is then determined whether the record is for the same IEP detail and in the same reporting time period. If the record is for the same IEP detail and for the same reporting time period, the method returns to step 308. If there are no more records to be read in step 310, the process ends in step 312.

If it is determined in step 304 that the main service provider is not the same as the IEP details service provider, the next record is read in step 314. Thus the services provided by a service provider other than the main service provider are not included in the totals counter.

In step 316, it is determined whether the IEP of the new record is different from the IEP for the old record. This includes, for example, comparing data stored in step 302 to data for the new record. If the IEP of the new record is not different from the IEP for the old record, the method continues in step 304.

If the IEP of the new record is different from the IEP for the old record, in step 318, it is determined whether the new record is for the same student/provider/school/service combination. This includes, for example, comparing data stored in step 302 to data for the new record. If the data for the new record is the same as the data for the old record, the method continues in step 304.

If the data for the new record is the different from the data for the old record, the method returns to step 302, wherein information for the new record is stored.

If it is determined in step 320 that the new record does not have the same IEP detail or is not in the same reporting period as the last record, the IEP details for the given time period are printed or written, for example, to a report in step 322. The totals counter is then reset in step 324, and the method then returns to step 316.

FIGS. 14–18 illustrate sample screens that are displayed to a user running a report on the number of encounters provided. In one embodiment of the present invention, the screens displayed to a user depend, however, on the role assigned to the user or on user permissions. For example, upon first executing an application in accordance with the present invention, a service provider may be presented with an individualized caseload; however, the service provider may not have permission to change the IEPs in the system.

Figure 14:
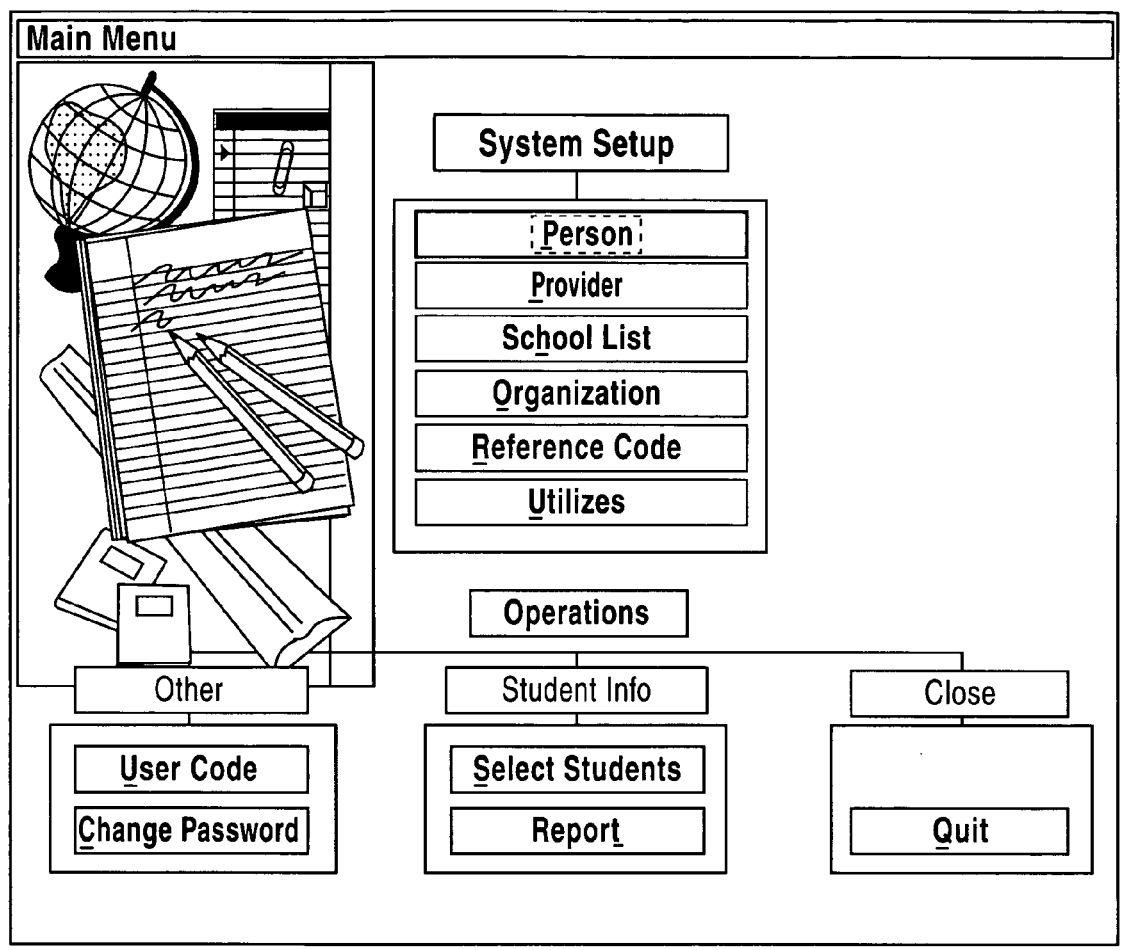
FIG. 14 is an example Graphical User Interface (GUI) screen shot for encounter tracker functions, in accordance with an embodiment of the present invention.

FIG. 14 is an example GUI screen shot for encounter tracker functions, in accordance with an embodiment of the present invention. This GUI screen shot is displayed to a user, for example, upon login. The user selects "Report" to activate the reporting functionality.

Figure 15:
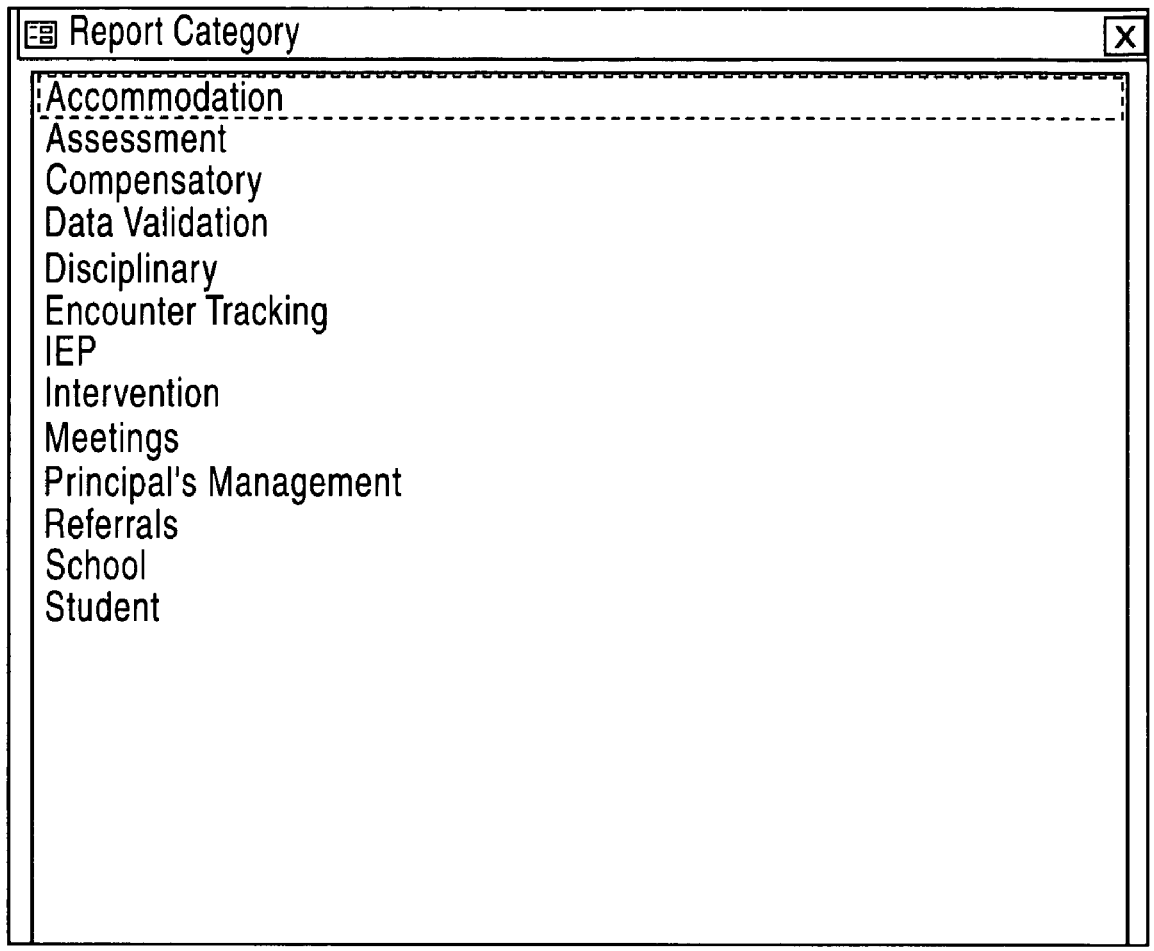
FIG. 15 is an example GUI screen shot for encounter tracker functions, in accordance with an embodiment of the present invention.

In FIG. 15, the presented screen shot is displayed, for example, after a user selects "Report" from the GUI of FIG. 14. The user selects "Encounter Tracking" to activate the encounter tracking functionality.

In FIG. 16, the presented screen shot is displayed, for example, after a user selects "Encounter Tracking" from the GUI of FIG. 15. The user selects "Service Provider's Summary (For All Students)" and enters information to activate the service provider summary functionality. The information entered by the user includes, for example, school or area/district data, interval data, data range data, and optional service provider data. The also selects either "Print" or "Preview" to print or preview the report.

Figure 17:
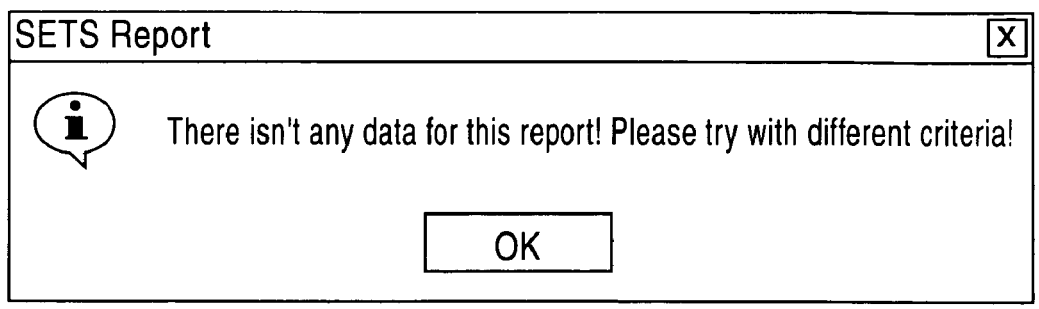
FIG. 17 is an example GUI screen shot for encounter tracker functions, in accordance with an embodiment of the present invention.

In FIG. 17, the shown GUI is displayed, for example, if there are no data for the search criteria entered by the user in the GUI of FIG. 16.

FIGS. 18A–B are example GUI screen shots that are displayed after a user selects "Preview" from the GUI of FIG. 16. The data shown in the report includes, for example, student personal identification number, student database identification, student date of birth, student first name, student last name, service provider first name, service provider last name, number of sessions per interval for service, date of session encounter, total of all sessions for time period, school identification, school name, grade, nature of service provided, nature of service provided identification, duration of a single encounter, interval identification, whether the encounter was met or provided, whether the encounter was missed, whether the encounter was made up, whether the session for an encounter was met, whether the session for the encounter was attempted, whether the session for the encounter was missed, and whether the session for the encounter was made up. As shown in FIG. 18A–B, the report shows the calculated service gap as number of sessions and number of hours.

Figure 19:
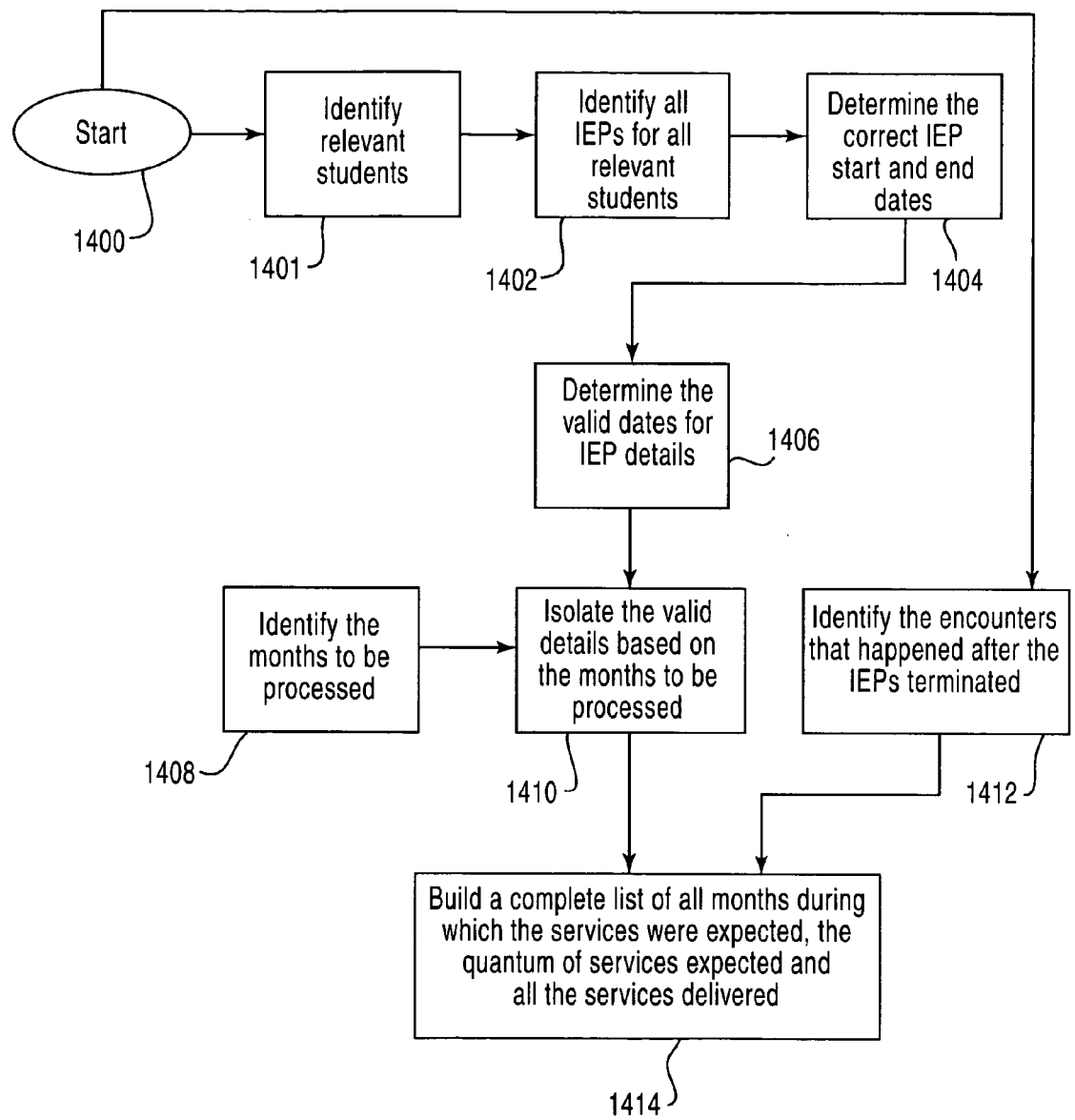
FIG. 19 is a flow diagram illustrating a process for service gap analysis, in accordance with an embodiment of the present invention.

FIG. 19 is a flow diagram illustrating a process for service gap analysis, in accordance with an embodiment of the present invention. The process creates a listing of specified time periods, such as months, and for each time period, lists the number of services expected and the number of services delivered.

The process begins in step 1400. In step 1401, the relevant students are identified. In step 1402, all IEPs for all relevant students are identified. In step 1404, the correct start and end dates for these IEPs are determined. In step 1406, the valid dates for the IEP details are determined based on the correct start and end dates.

In step 1408, the time periods to be processed are identified. The time periods to be processed are the time periods for which a service gap analysis is to be generated. This information may be input by a user, or may be identified automatically by a system. For example, a system could automatically identify the current month.

In step 1410, the valid details based on the months to be processed are identified. The valid details are the details that occurred during a valid date for an IEP, as determined in step 1406; and also occurred during a time period to be processed, as identified in step 1408.

In step 1412, the encounters that happened after the IEPs terminated are identified. In step 1414, the results of step 1410 and 1412 are used to build a complete list of all time periods during which services were expected, the number of services expected, and the number of services delivered.

One embodiment of the present invention provides functionality to convert prescribed and delivered services to a common base. For example, prescribed and delivered services can be converted to and expressed in minutes per week, hours per month, or any other appropriate form. This functionality enables comparison of prescribed and delivered services.

Figure 20:
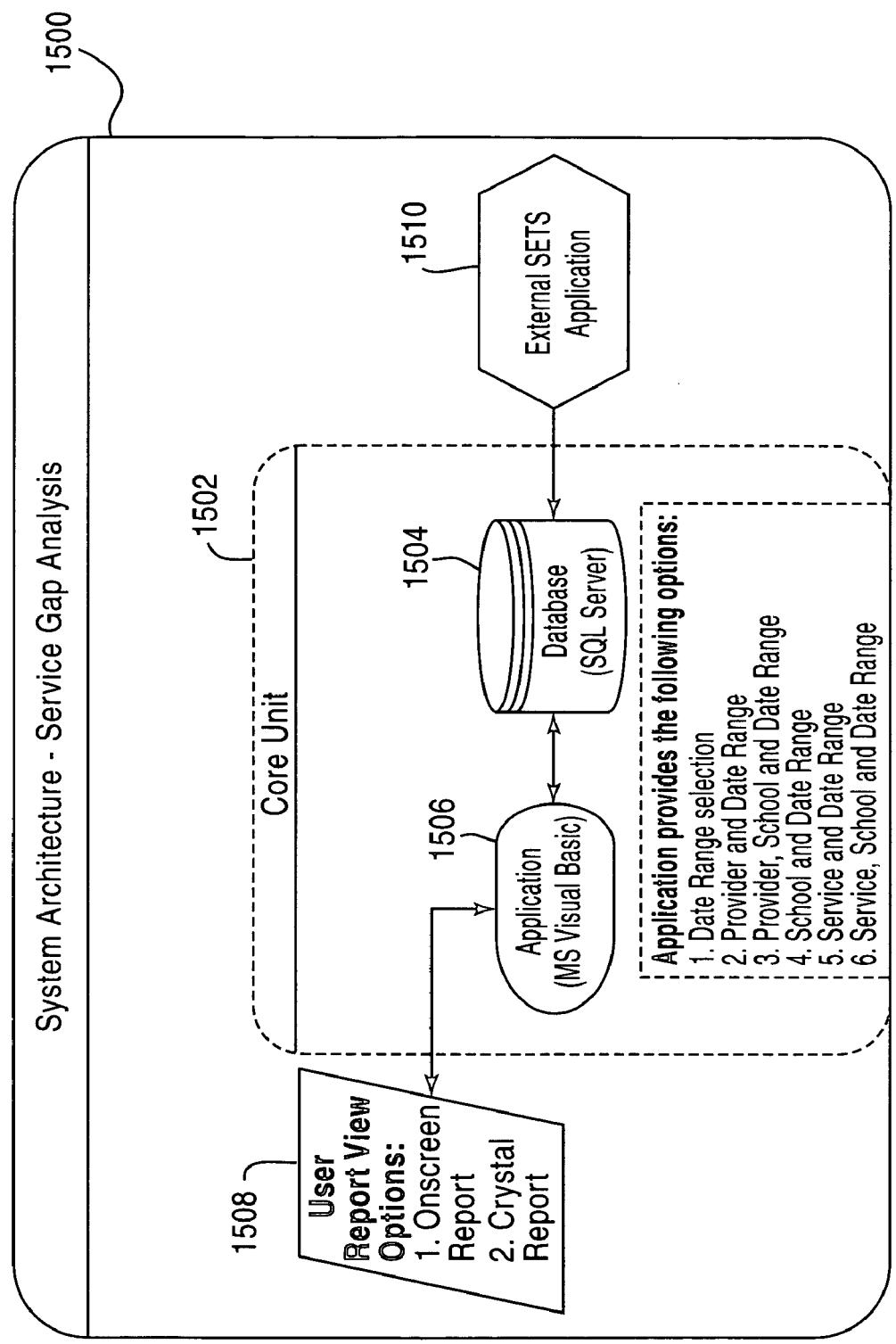
FIG. 20 illustrates a system for service gap analysis, in accordance with an embodiment of the present invention.

FIG. 20 is a representative diagram illustrating a system 1500 for encounter tracking and service gap analysis, in accordance with an embodiment of the present invention. The system includes a core unit 1502 such as a PC, minicomputer. mainframe computer, microcomputer, telephonic device, or wireless device, such as a hand-held wireless device. The core unit 1502 has a processor and a repository for data or a connection to a repository for data. The core unit 1502 may be connected to a network, such as the Internet or an intranet, via couplings. The couplings include, for example, wired, wireless, or fiberoptic links. In another embodiment, the method and system of the present invention operate in a stand-alone environment, such as on a single terminal.

The system 1500 also includes a storage system 1504, such as a database, text file, or other electronic storage system. The storage system 1504 is located, for example, within the core unit 1502.

The system 1500 also includes an application 1506. The application is located, for example, on the core unit 1502. The application 1506 is implemented, for example, as machine-readable and machine executable instructions. These instructions are executed, for example, on the core unit 1502. The application includes functionality for encounter tracking, service gap analysis, and reimbursement.

A user 1508 may interact with the application 1506 via an input device on the core unit 1502, such as, for example, a keyboard, a mouse, or another input device. In response to the input from the user, the application 1506 may access information in the storage unit 1504 and may generate output to display to the user 1508 via a display device, such as a monitor or printer, located in or in communication with the core unit 1502. The user may also input, delete, or edit information in the storage unit 1504 via the application 1506.

An external application 1510, such as SETS or Encore, may exist on the core unit 1502 and may interact with the user and the database as well. The external application identifies service providers, provides for customizable scheduling, and provides other features. Actions performed using the external application may impact the information stored in the storage unit 1504. In one implementation, however, rather than being a separate application, the external application is integrated with the application 1506.

Figure 21:
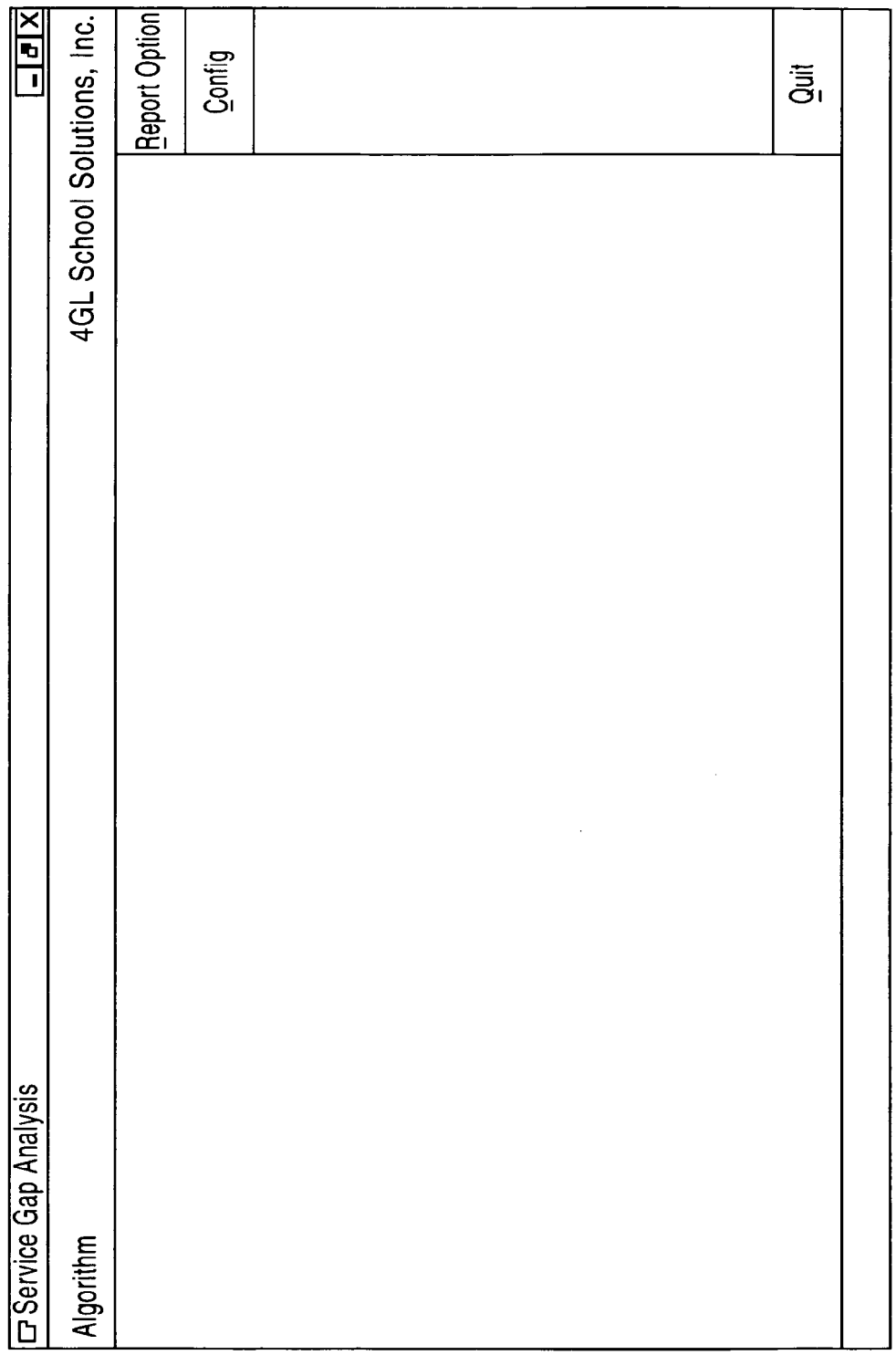
FIG. 21 is an example GUI screen shot for service gap analysis, in accordance with an embodiment of the present invention.
Figure 22:
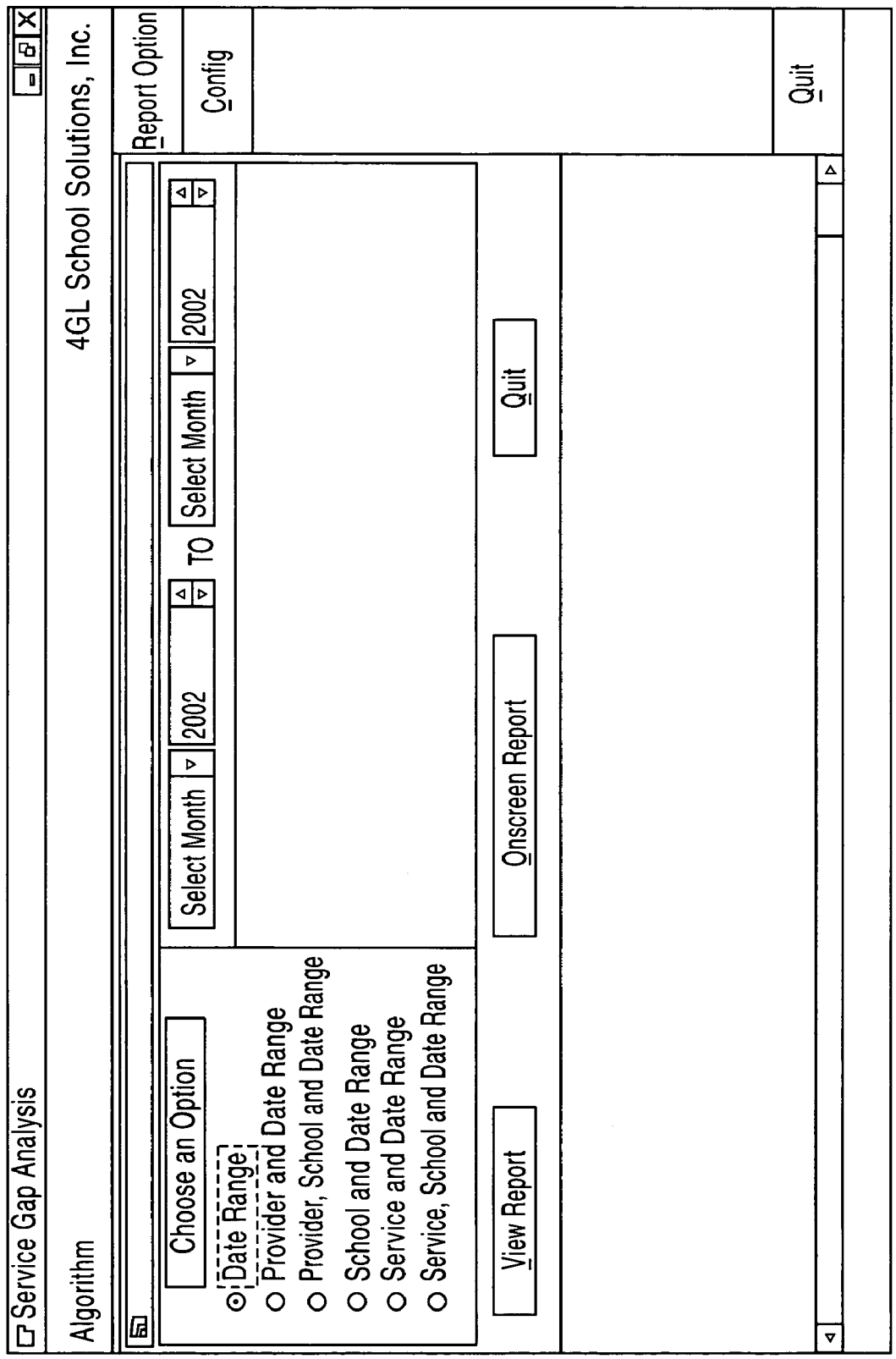
FIG. 22 is an example GUI screen shot for service gap analysis, in accordance with an embodiment of the present invention.

FIGS. 21–23 illustrate sample GUI screens that are displayed to a user when a user performs a service gap analysis report.

FIG. 21 is an example GUI screen shot that is displayed after a user executes the application. FIG. 21 contains three buttons presenting a user with the following 3 options: Report Option, Config, Quit. The user selects "Report Option" to activate the service gap reporting functionality.

FIG. 22 is an example GUI screen shot for service gap analysis that is displayed after a user selects "Report Option" from the GUI of FIG. 21. The user selects a type of report. For example, the user may select a report based on a date range; a service provider and date range; a service provider, school, and date range; a school and date range, a type of service and date range; or a type of service school, and date range. The user also selects either "View Report," which allows the user to view, print, and email the report, "Onscreen Report" view the report onscreen, or "Quit" to exit from the system.

FIG. 23 is an example GUI screen shot for service gap analysis that is displayed after a user selects a Date Range Report and selects "Onscreen Report" from the GUI of FIG. 22. The data displayed in the report is sorted, for example, by student, and includes, for example, the months or other time periods in the specified date range, the number of expected services, the number of actual services provided, and the shortfall or excess, or difference between expected services and actual services, cumulative shortfall (including shortfall outside the specified date range), the number of expected encounters, the number of actual encounters or sessions provided, the shortfall or excess of encounters or sessions, and the cumulative shortfall of encounters or sessions.

Example embodiments of the present invention have now been described in accordance with the above advantages. It will be appreciated that these examples are merely illustrative of the invention. Many variations and modifications will be apparent to those skilled in the art. For example, while systems have been described in terms of one machine, the invention may be practiced in a distributed networking environment such as, for example, a Local-Area Network (LAN), Virtual Private Network (VPN), intranet, or the Internet.

The invention claimed is:

1. A method for educational or disability related service gap analysis, the method comprising:
   at a computer processor, receiving information describing an educational or disability related service encounter describing at least one of the educational or disability related service encounters being performed, missed, missing attempted and made up;
   at the computer processor, receiving a date range from a user;
   at the computer processor, identifying at least one education or disability service plan that is valid within the date range based on input from the user;
   at the computer processor, determining the expected number of educational or disability related services within the date range by performing a calculation based on information included in the at least one educational or disability related service plan;
   at the computer processor, identifying at least one educational or disability related encounter associated with the educational or disability related service plan occurring within the date range by accessing a storage medium readable by the computer processor,
   at the computer processor, comparing the expected number of educational or disability related services with the number of identified educational or disability related encounters for the educational or disability related service plan;
   at the computer processor, generating information indicating required educational or disability related services that were missed, missing, and performed, attempted and made-up' and
   at the computer processor, generating a result for the at least one identified educational or disability related service plan, the result indicating the shortfall and surplus of educational or disability related encounters for the at least one identified educational or disability related service plan.

2. The method of claim 1, wherein the education or disability service plan is an individual education plan used in complying with the individuals with Disabilities Education Act.

3. The method of claim 1, further comprising:
   at the computer processor, electronically determining a expected duration of education or disability services within the date range by performing a calculation based on information included in the at least one education or disability service plan; and
   at the computer processor, electronically determining the number and duration of identified education or disability encounters by performing a calculation based on information associated with the identified education or disability encounters.

4. The method of claim 3, further comprising: at the computer processor electronically converting the expected number and duration of education or disability services and the number and duration of identified education or disability encounters to a common unit of measurement', and
   at the computer processor, comparing the expected number and duration of education or disability services and the number and duration of identified education or disability encounters to determine the variance between them.

5. The method of claim 1, further comprising:
   at the computer processor, comparing the expected number of education or disability services for all identified education or disability service plans with the number of identified education or disability encounters for all identified education or disability service plans.

6. The method of claim 1, wherein electronically determining the expected number of education or disability services comprises:
   at the computer processor factoring in the number of available days for education or disability service based on a calendar and based on any identified education or disability gaps in service.

7. The method of claim 6, wherein the calendar is a school calendar.

8. The method of claim 1, wherein the date range is divided into at least one time period.

9. The method of claim 8, further comprising:
   at a computer processor, for each time period and each education or disability service plan, comparing the expected number of education or disability services within the time period with the number of identified education or disability encounters for the education or disability service plan within the time period.

10. The method of claim 9, wherein at the computer processor a result is produced for each time period and each education or disability service plan, the result including a number indicating the shortfall or surplus of education or disability encounters for the education or disability service plan within the time period.

11. The method of claim 8, further comprising:
at the computer processor, for each time period, comparing the expected number of education or disability services for all identified education or disability service plans with the number of identified education or disability encounters for all identified service plans.

12. The method of claim 11, wherein at the computer processor, a result is produced for all identified education or disability service plans for each time period, the result including a number indicating the shortfall or surplus of education or disability encounters for all identified education or disability service plans within the time period.

13. The method of claim 1, wherein the at least one identified education or disability encounter for a education or disability service plan includes each education or disability encounter that occurred after the service plan terminated.

14. The method of claim 1, wherein each of the at least one identified education or disability encounter is associated with a education or disability service that was provided or attempted.

15. A method for entering education or disability encounter information into a storage system, the method comprising:
at a computer processor, receiving information describing a education or disability service encounter actually performed, the received information including an education or disability encounter type and the duration of the encounter',
storing information describing the education or disability service encounter in an electronic storage medium readable by the computer processor, the stored information including the education or disability encounter type and the duration of the education or disability encounter', and
at the computer processor, comparing an expected number of education or disability services with the education or disability service encounter actually performed;
at the computer processor, generating information indicating required education or disability service that were missed, missing, and met, attempted and made-up and
at the computer processor, generating a result for the comparison, the result indicating the shortfall and surplus of education or disability encounters. wherein the stored information is associated with a education or disability service plan, an individual receiving the education or disability service, and a education or disability service provider.

16. The method of claim 15, wherein the education or disability encounter type specifies one selected from a group consisting of services provided, attempted services, and missed services.

17. A system for assisting a management entity with compliance with a management scheme, the management scheme including a plurality of requirements, the system comprising:
means for receiving a date range from a user;
means for identifying one or more education or disability service plans that are valid within the date range, based on input from the user;
means for electronically determining the expected number of education or disability services within the date range by performing a calculation based on information included in the at least one education or disability service plan;
means for electronically identifying at least one education or disability encounter associated with the education or disability service plan occurring within the date range by accessing a storage medium readable by a computer', and
means for comparing the expected number of education or disability services with the number of identified education or disability encounters for the education or disability service plan;
means for generating information indicating required services that were missed missing, and met, attempted and made-up, and
means for generating a result for the at least one identified education or disability service plan, the result indicating the shortfall and surplus of education or disability encounters for the at least one identified education or disability service plan.

18. The system of claim 17, further comprising:
means for electronically determining the expected duration of education or disability services within the date range by performing a calculation based on information included in the at least one education or disability service plan; and
means for electronically determining the number and duration of identified education or disability encounters by performing a calculation based on information associated with the identified education or disability encounters.

19. The system of claim 18, further comprising:
means for electronically converting the expected number and duration of education or disability services and the number and duration of identified education or disability encounters to a common unit of measurement; and
means for comparing the expected number and duration of education or disability services and the number and duration of identified education or disability encounters to determine the variance between them.

20. The system of claim 17, wherein electronically determining the expected number of education or disability services comprises:
factoring in the number of available days for education or disability service based on a calendar and based on any identified gaps in education or disability service.

21. The system of claim 20, wherein the calendar is a school calendar.

22. A system for assisting a management entity with compliance with a service plan, the management scheme including a plurality of requirements, the system comprising:
a processor;
a user interface functioning via the processor, and
a repository accessible by the processor;
wherein a date range is received via the user interface and stored in the repository;
wherein at least one education or disability service plan that is valid within the date range is identified via the processor;
wherein the expected number of education or disability services within the date range is determined via the processor', and
wherein, one or more encounters associated with the service plan occurring within the date range is identified via the processor wherein the expected education or disability number of services are compared with the number of identified education or disability encounters for the education or disability service plan; and wherein information indicating required education or disability services that were missed, missing, and met, attempted and made-up are generated, and wherein a result is generated for the at least one identified education or disability service plan, the result indicating the shortfall and surplus of education or disability encounters for the at least one identified education or disability service plan.

23. The system of claim 22, wherein the processor is housed on a terminal.

24. The system of claim 23, wherein the terminal is selected from a group consisting of a personal computer, a minicomputer, a main frame computer, a microcomputer, a hand held device, and a telephonic device.

25. The system of claim 22, wherein the processor is housed on a server.

26. The system of claim 25, wherein the server is selected from a group consisting of a personal computer, a minicomputer, a microcomputer, and a main frame computer.

27. The system of claim 25, wherein the server is coupled to a network.

28. The system of claim 27, wherein the network is the Internet.

29. The system of claim 27, wherein the server is coupled to the network via a coupling.

30. The system of claim 29, wherein the coupling is selected from a group consisting of a wired connection, a wireless connection, and a fiberoptic connection.

31. The system of claim 22, wherein the repository is housed on a server.

32. The system of claim 31, wherein the server is coupled to a network.

33. A computer program product comprising a computer usable medium having control logic stored therein for causing a computer to run a education or disability service gap analysis the control logic comprising;

first computer readable program code means identifying at least one education or disability service plan that is valid within the date range;

second computer readable program code means for determining the expected number of education or disability services within the date range;

third computer readable program code means for identifying at least one education or disability encounter associated with the education or disability service plan occurring within the date range fourth computer readable program code means for comparing the expected number of education or disability services with the number of identified education or disability encounters for the education or disability service plan, fifth computer readable program code means for generating information indicating required services, that were missed services, missing services, and services met, attempted and made-up', and sixth computer readable program code means for generating a result for the at least one identified education or disability service plan the result indicating the shortfall and surplus of education or disability encounters for the at least one identified education or disability service plan.

* * * * *